US012584889B1

(12) United States Patent
Aparicio et al.

(10) Patent No.: US 12,584,889 B1
(45) Date of Patent: Mar. 24, 2026

(54) SYSTEM, APPARATUS, AND METHOD FOR CORROSION MAPPING OF A FLANGE JOINT

(71) Applicant: Gecko Robotics, Inc., Pittsburgh, PA (US)

(72) Inventors: Jose Aparicio, Katy, TX (US); Chase David, Montgomery, TX (US)

(73) Assignee: Gecko Robotics, Inc., Pittsburgh, PA (US)

( * ) Notice: Subject to any disclaimer, the term of this patent is extended or adjusted under 35 U.S.C. 154(b) by 362 days.

(21) Appl. No.: 18/193,460

(22) Filed: Mar. 30, 2023

Related U.S. Application Data

(60) Provisional application No. 63/489,353, filed on Mar. 9, 2023, provisional application No. 63/326,154, filed on Mar. 31, 2022.

(51) Int. Cl.
| | |
|---|---|
| *G01N 29/22* | (2006.01) |
| *G01N 29/04* | (2006.01) |
| *G01N 29/24* | (2006.01) |

(52) U.S. Cl.
CPC .......... *G01N 29/225* (2013.01); *G01N 29/04* (2013.01); *G01N 29/24* (2013.01); *G01N 2291/023* (2013.01); *G01N 2291/02854* (2013.01); *G01N 2291/106* (2013.01)

(58) Field of Classification Search
CPC ...... G01N 29/225; G01N 29/04; G01N 29/24; G01N 2291/023; G01N 2291/02854; G01N 2291/106
See application file for complete search history.

(56) References Cited

U.S. PATENT DOCUMENTS

| | | | | |
|---|---|---|---|---|
| 11,548,577 | B2 | 1/2023 | Abdellatif et al. | |
| 2015/0329221 | A1* | 11/2015 | Georgeson | H04L 41/0695 |
| | | | | 702/36 |
| 2016/0069839 | A1* | 3/2016 | Bueno | G01N 29/262 |
| | | | | 73/628 |
| 2018/0321192 | A1* | 11/2018 | Gardner | G01N 29/043 |
| 2022/0011274 | A1* | 1/2022 | Shehab | G01N 29/28 |

* cited by examiner

*Primary Examiner* — Xin Y Zhong
(74) *Attorney, Agent, or Firm* — GTC Law Group PC & Affiliates

(57) ABSTRACT

A system for inspecting a flange member includes an inspection assembly support ring having an inner arc portion and an outer inspection assembly mount portion. The inner arc portion has an inner diameter structured to mount on the flange member, and the outer inspection assembly mount portion is rotationally coupled to the inner arc portion with a plurality of bearings interposed therebetween. The system further includes an inspection assembly mounted on the outer inspection assembly mount portion, and the inspection assembly includes an ultrasonic (UT) sensor on a pivot arm. The UT sensor is structured to interrogate a tapered surface of the flange member and to acquire UT interrogation data therefrom.

31 Claims, 37 Drawing Sheets

O.D

I.D

110

120

212

212

218

246

802

0.0°

ON/OFF    ZERO 22.2°

802

22.2°

ON/OFF    ZERO 22.2°

C-MAP

C-MAP

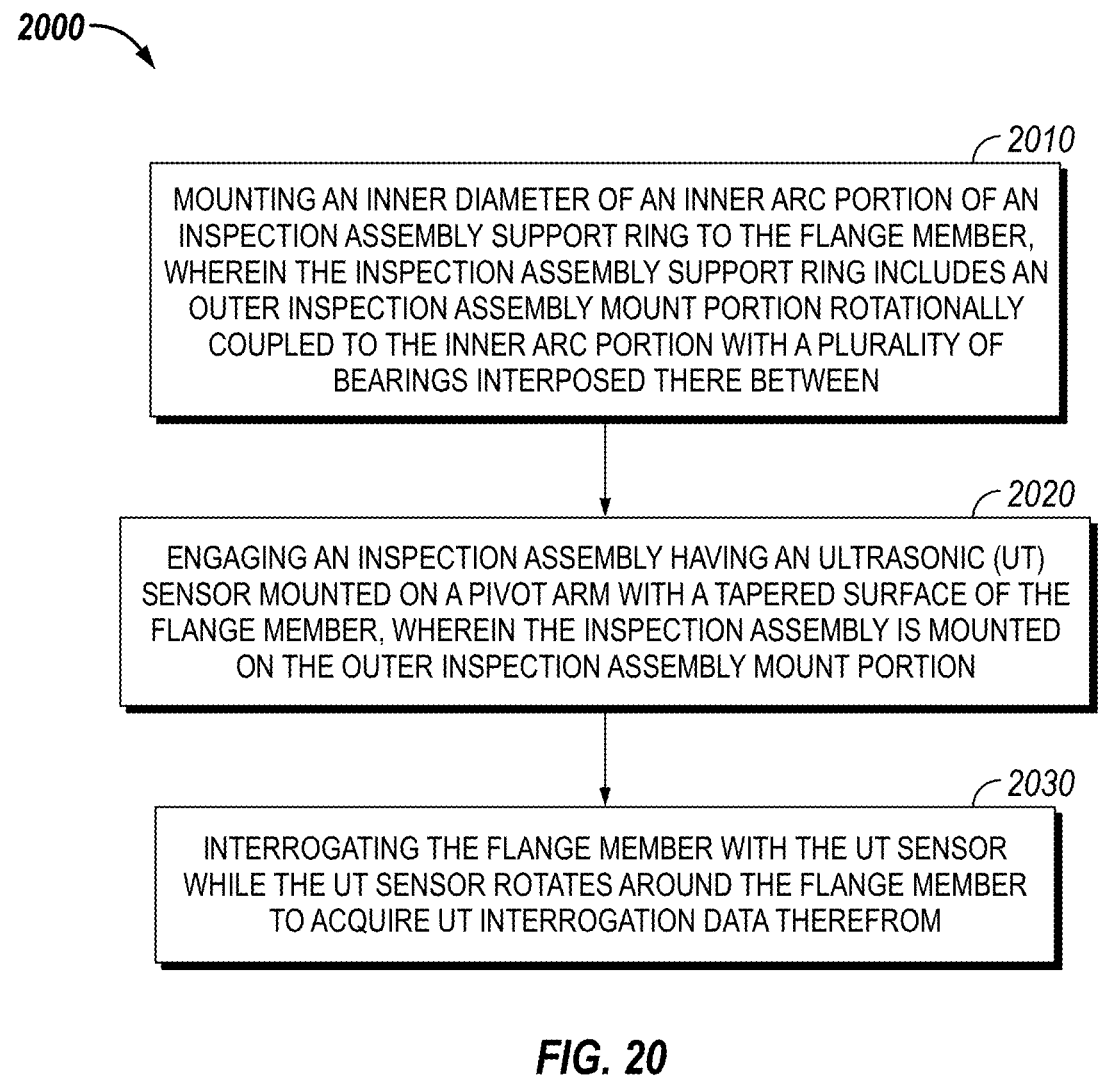

2000

┌─────────────────────────────────────────────────────────────┐ ┌ 2010
│ MOUNTING AN INNER DIAMETER OF AN INNER ARC PORTION OF AN     │
│ INSPECTION ASSEMBLY SUPPORT RING TO THE FLANGE MEMBER,       │
│ WHEREIN THE INSPECTION ASSEMBLY SUPPORT RING INCLUDES AN     │
│ OUTER INSPECTION ASSEMBLY MOUNT PORTION ROTATIONALLY         │
│ COUPLED TO THE INNER ARC PORTION WITH A PLURALITY OF         │
│ BEARINGS INTERPOSED THERE BETWEEN                            │
└─────────────────────────────────────────────────────────────┘

┌─────────────────────────────────────────────────────────────┐ ┌ 2020
│ ENGAGING AN INSPECTION ASSEMBLY HAVING AN ULTRASONIC (UT)    │
│ SENSOR MOUNTED ON A PIVOT ARM WITH A TAPERED SURFACE OF THE  │
│ FLANGE MEMBER, WHEREIN THE INSPECTION ASSEMBLY IS MOUNTED    │
│ ON THE OUTER INSPECTION ASSEMBLY MOUNT PORTION              │
└─────────────────────────────────────────────────────────────┘

┌─────────────────────────────────────────────────────────────┐ ┌ 2030
│ INTERROGATING THE FLANGE MEMBER WITH THE UT SENSOR          │
│ WHILE THE UT SENSOR ROTATES AROUND THE FLANGE MEMBER        │
│ TO ACQUIRE UT INTERROGATION DATA THEREFROM                  │
└─────────────────────────────────────────────────────────────┘

*FIG. 20*

SYSTEM, APPARATUS, AND METHOD FOR CORROSION MAPPING OF A FLANGE JOINT

CROSS-REFERENCE TO RELATED APPLICATIONS

This application claims priority to U.S. Provisional Patent Application Ser. No. 63/326,154, filed Mar. 31, 2022, entitled SYSTEM, APPARATUS, AND METHOD FOR CORROSION MAPPING OF A FLANGE JOINT.

This application claims priority to U.S. Provisional Patent Application Ser. No. 63/489,353, filed Mar. 9, 2023, entitled SYSTEM, APPARATUS, AND METHOD FOR CORROSION MAPPING OF A FLANGE JOINT.

The above applications are hereby incorporated by reference as if fully set forth herein in their entirety.

BACKGROUND

A flange (or "flanged") joint may connect two members of piping or another vessel, such as may be used to transport fluids. For example, the oil and gas industries may use flange joints to connect piping used to transport oil or gas. As illustrated in FIG. 1A, an example of a flange joint may include a weld neck flange, which may have a tapered neck and may be sealed at each of the terminal ends of two connecting pipes. Between the two illustrated weld neck flanges may be a gasket, which seals the connecting or "sealing" surfaces of the flanges. FIG. 1B illustrates an example flange member of a flange joint 100, including a raised face 110 that may serve as a sealing surface of the flange joint, and a tapered neck 120.

A crevice created at the inside and/or outside of a flange joint may present an inherent location for localized corrosion of the sealing surfaces. For example, activity of fluids inside the pipe, and/or external influences such as caused by an aggressive environment (e.g., offshore drilling) may respectively cause crevice corrosion of the sealing surfaces from the inside diameter (I.D.) of the flange and the outside diameter (O.D.) of the flange. Left unaddressed, such corrosion may cause leaks and even catastrophic damage. It is important to accurately determine flange corrosion before damage occurs to such an extent, especially in scenarios where the pipes carry potentially lethal fluid—for example, in a hydrofluoric acid refinery or for fluids having a high $H_2S$ content.

In one example, to detect the corrosion of the flange sealing surfaces, the entire system may be shut down such that fluid no longer flows, the pipes may be decontaminated, and every flange joint of the system may be manually opened to physically check the sealing surfaces through a visual inspection. But even with the intensive manual labor and time involved, the probability of accurately detecting flange corrosion in this manner may only be around 15%.

There have been attempts to check the sealing surfaces using ultrasound technology, but the probability of detection of corrosion in such systems is very low—e.g., lower than 15%—and typically involves a qualitative and imperfect analysis.

For example, in the related art of FIGS. 2A-2C, an amplitude-based ultrasonic wave may be shot by a probe from the outer diameter of the flange between bolt holes, as shown in FIG. 2C, using a manual device (Type 1) or a mechanized device (Type 2) illustrated in FIGS. 2A and 2B, respectively, to acquire a corrosion mapping based on a shape of the damage, as illustrated in FIG. 2D. However, as exemplified in FIG. 2D, the resulting data is highly imprecise as well as completely absent except between the bolts. Further, in this related art, the flange may have to be in a late stage of corrosion damage in order to have any significant chance of being detected. The probability of detecting corrosion (if it exists) may be on the order of 8%.

As another example, in the related art of FIGS. 3A-3C, an ultrasonic probe may be manually placed between the bolts on the outer surface of the flange, as shown by example in FIG. 3A, and shoot ultrasonic waves in, e.g., the direction(s) shown in FIG. 3B (e.g., the directions between and including the arrows), to obtain data as shown in FIG. 3C. Geometric indications (such as the larger dark spots of FIG. 3C) may suggest corrosion, but such indications are far from conclusive and the size of the corrosion is hard to quantify. Thus, this technique may not be able to find damage at early stages, and the probability of detecting significant corrosion at any stage may be very low. Further, like the related art of FIGS. 2A-2D, the bolts obstruct a complete collection of data around the flange.

As a further example, in the related art of FIGS. 4A-4B, a user may manually hold an ultrasonic probe against the tapered neck of the flange (which may also be described as transitioned or angled) to shoot amplitude-based ultrasonic waves and receive data therefrom. The probe may be manually encoded, such as when the human operator manually moves the probe around the flange. However, because the probe is not fully attached to the neck and depends upon manual control that, e.g., does not follow a linear scanning path, the resulting data is inaccurate and difficult to interpret. Such a method also relies on the expertise of the human operator for moving the probe about the flange. In a related example illustrated in FIG. 4C, the ultrasonic probe may be part of a mechanical apparatus, but such an apparatus is not aligned and locked around the flange. Because paint as well as other bumps and imperfections on the flange are so thick and variable, this mechanical apparatus may not provide a realistically feasible method for detecting sealing surface corrosion, and a user may be forced to resort to using the probe in a handheld manner as described with reference to FIG. 4A. The size and weight of this mechanical apparatus may also be unwieldy.

SUMMARY

In some aspects, the techniques described herein relate to a system for inspecting a flange member, including: an inspection assembly support ring having an inner arc portion and an outer inspection assembly mount portion, the inner arc portion having an inner diameter structured to mount on the flange member, and the outer inspection assembly mount portion rotationally coupled to the inner arc portion with a plurality of bearings interposed therebetween; and an inspection assembly mounted on the outer inspection assembly mount portion, wherein the inspection assembly includes an ultrasonic (UT) sensor on a pivot arm, the UT sensor structured to interrogate a tapered surface of the flange member and to acquire UT interrogation data therefrom.

In some aspects, the techniques described herein relate to a system, further including: the inner arc portion further having a clamp member structured to fixedly couple the inspection assembly support ring to the flange member.

In some aspects, the techniques described herein relate to a system, wherein the UT sensor is a phased array of UT sensors.

In some aspects, the techniques described herein relate to a system, wherein the pivot arm maintains a fixed angle between a first arm of the inspection assembly and a final arm holding the UT sensor.

In some aspects, the techniques described herein relate to a system, wherein a diameter of the flange member is greater than or equal to 1 inch and less than or equal to 10 inches.

In some aspects, the techniques described herein relate to a system, wherein the inspection assembly is structured to provide both radial and axial movement of the UT sensor for rastering along the tapered surface.

In some aspects, the techniques described herein relate to a system, wherein the inspection assembly is further structured to provide for azimuthal movement.

In some aspects, the techniques described herein relate to a system, further including: a circuit structured to determine a degradation description based on the UT interrogation data.

In some aspects, the techniques described herein relate to a system, further including: a first encoder structured to determine, as a flange position value, an azimuthal position of the inspection assembly; and a second encoder structured to determine, as a UT engagement angle, at least one of a pivot angle of the pivot arm or an engagement angle of the UT sensor with the tapered surface.

In some aspects, the techniques described herein relate to a system, wherein the circuit further includes: an inspection conditions circuit structured to interpret the flange position value and the UT engagement angle; an inspection execution circuit structured to instruct the UT sensor to interrogate the tapered surface of the flange member based on the flange position value and the UT engagement angle and associate the UT interrogation data with the flange position value and the UT engagement angle; and an inspection reporting circuit structured to determine the degradation description based on the UT interrogation data.

In some aspects, the techniques described herein relate to a system, wherein the circuit is structured to apply a normalizing distance value to determine the degradation description.

In some aspects, the techniques described herein relate to a system, wherein the circuit is structured to determine the degradation description further based on at least one of a determined pitch value of the UT sensor or a taper angle of the tapered surface.

In some aspects, the techniques described herein relate to a system, wherein the circuit is further structured to: determine a probe angle offset value when sound energy from the UT sensor is not perpendicular to a sealing surface of the flange member; and determine the degradation description in response to the probe angle offset value.

In some aspects, the techniques described herein relate to a system, wherein: the degradation description includes a corrosion mapping representing a thickness of a flange scaling surface of the flange member and having an azimuthal component and a radial component; and the corrosion mapping is configured to be displayed on a display device.

In some aspects, the techniques described herein relate to a method for inspecting a flange member, including: mounting an inner diameter of an inner arc portion of an inspection assembly support ring to the flange member, wherein the inspection assembly support ring includes an outer inspection assembly mount portion rotationally coupled to the inner arc portion with a plurality of bearings interposed therebetween; engaging an inspection assembly having an ultrasonic (UT) sensor mounted on a pivot arm with a tapered surface of the flange member, wherein the inspection assembly is mounted on the outer inspection assembly mount portion; and interrogating the flange member with the UT sensor while the UT sensor rotates around the flange member to acquire UT interrogation data therefrom.

In some aspects, the techniques described herein relate to a method, further including: fixedly coupling the inspection assembly support ring to the flange member.

In some aspects, the techniques described herein relate to a method, wherein the UT sensor interrogates the flange member while the UT sensor rotates around the flange member in a first direction.

In some aspects, the techniques described herein relate to a method, further including: adjusting a position of the UT sensor on the tapered surface of the flange member; and interrogating the flange member with the UT sensor while the UT sensor rotates around the flange member in a second direction that is opposite to the first direction to rasterize the UT interrogation data.

In some aspects, the techniques described herein relate to a method, further including: adjusting a position of the UT sensor on the tapered surface of the flange member; and continuing to rotate the UT sensor around the flange member in the first direction to rasterize the UT interrogation data.

In some aspects, the techniques described herein relate to a method, further including: determining a degradation description based on the UT interrogation data.

In some aspects, the techniques described herein relate to a method, further including: determining, as a flange position value, an azimuthal position of the inspection assembly; determining, as a UT engagement angle, at least one of a pivot angle of the pivot arm or an engagement angle of the UT sensor with the tapered surface; and determining the degradation description further based on the flange position value and the UT engagement angle.

In some aspects, the techniques described herein relate to a method, further including: based on the flange position value and the UT engagement angle, instructing the UT sensor to interrogate the flange member and associating the UT interrogation data with the flange position value and the UT engagement angle.

In some aspects, the techniques described herein relate to a method, wherein: the degradation description includes a corrosion mapping representing a thickness of a flange scaling surface of the flange member and having an azimuthal component and a radial component; and the corrosion mapping is configured to be displayed on a display device.

In some aspects, the techniques described herein relate to a method, further including: instructing the corrosion mapping to be displayed on the display device.

In some aspects, the techniques described herein relate to a method, wherein the UT interrogation data includes a plurality of sound path distances, and the determining the degradation description further includes: determining a plurality of thicknesses of the flange sealing surface for the corrosion mapping based on a trigonometric equation involving the plurality of sound path distances and a taper angle of the flange member; and generating the corrosion mapping to include a top view of the flange sealing surface that represents the plurality of thicknesses of the flange sealing surface with a plurality of colors.

In some aspects, the techniques described herein relate to a non-transitory computer readable storage medium storing instructions that when executed by a processor include: instructing an ultrasonic (UT) sensor to interrogate a flange member while the UT sensor rotates around a tapered surface of the flange member; receiving UT interrogation data from the UT sensor, wherein the UT interrogation data includes a plurality of sound path distances; determining a plurality of thicknesses of a sealing surface of the flange member based on the plurality of sound path distances and a taper angle of the tapered surface of the flange member; and generating, as a degradation description, a corrosion mapping representing a thickness of a flange sealing surface of the flange member and having an azimuthal component and a radial component, wherein the corrosion mapping is configured to be displayed on a display device.

In some aspects, the techniques described herein relate to a non-transitory computer readable storage medium, wherein the corrosion mapping includes a top view of the flange sealing surface that represents the plurality of thicknesses of the sealing surface with a plurality of colors.

In some aspects, the techniques described herein relate to a non-transitory computer readable storage medium, wherein the UT sensor is mounted on an inspection assembly including a pivot arm, and the instructions further including: determining, as a flange position value, an azimuthal position of the inspection assembly; and determining, as a UT engagement angle, at least one of a pivot angle of the pivot arm or an engagement angle of the UT sensor with the tapered surface.

In some aspects, the techniques described herein relate to a non-transitory computer readable storage medium, the instructions further including: determining the degradation description further based on the flange position value and the UT engagement angle.

In some aspects, the techniques described herein relate to a non-transitory computer readable storage medium, the instructions further including: determining the plurality of thicknesses of the sealing surface of the flange member based on a trigonometric equation involving the plurality of sound path distances and the taper angle of the tapered surface.

In some aspects, the techniques described herein relate to a non-transitory computer readable storage medium, the instructions further including: instructing the corrosion mapping to be displayed on the display device.

These and other systems, methods, objects, features, and advantages of the present disclosure will be apparent to those skilled in the art from the following detailed description of the many embodiments and the drawings.

BRIEF DESCRIPTION OF FIGURES

FIG. 20 is a flowchart of an example method for inspecting a flange member according to an example embodiment.

DETAILED DESCRIPTION

Figure 1A:
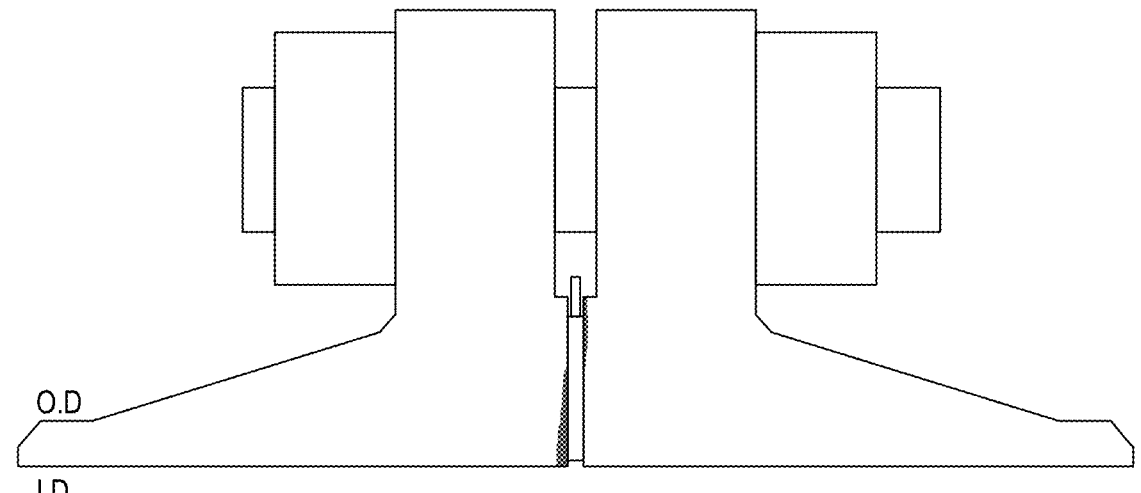
FIG. 1A depicts an example of a weld neck flange joint according to the related art.
Figure 1B:
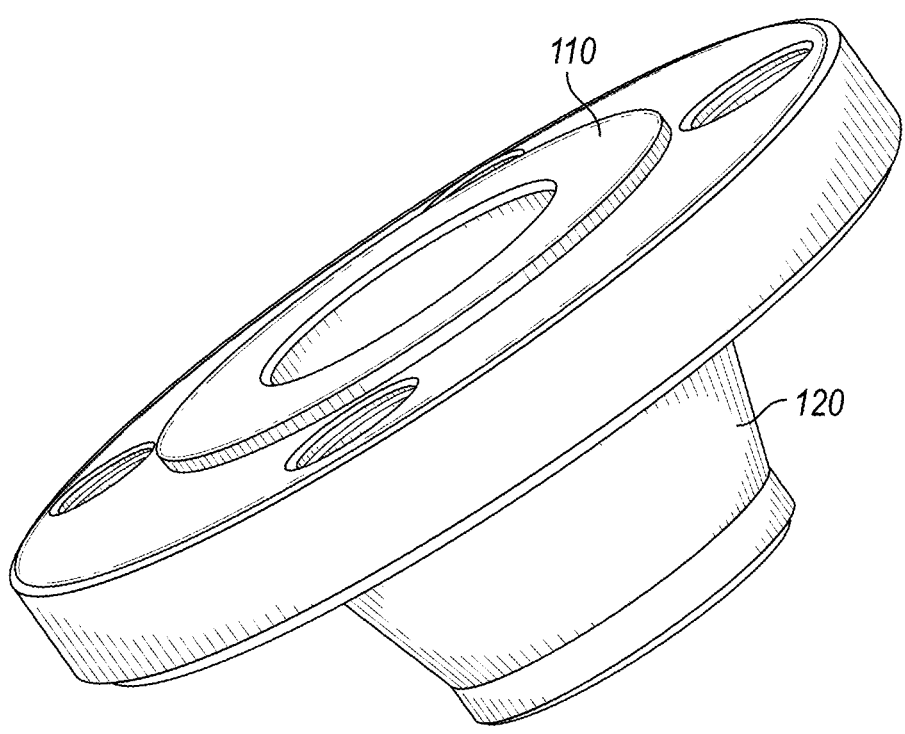
FIG. 1B depicts an example of a raised face flange member according to the related art.
Figure 2A:
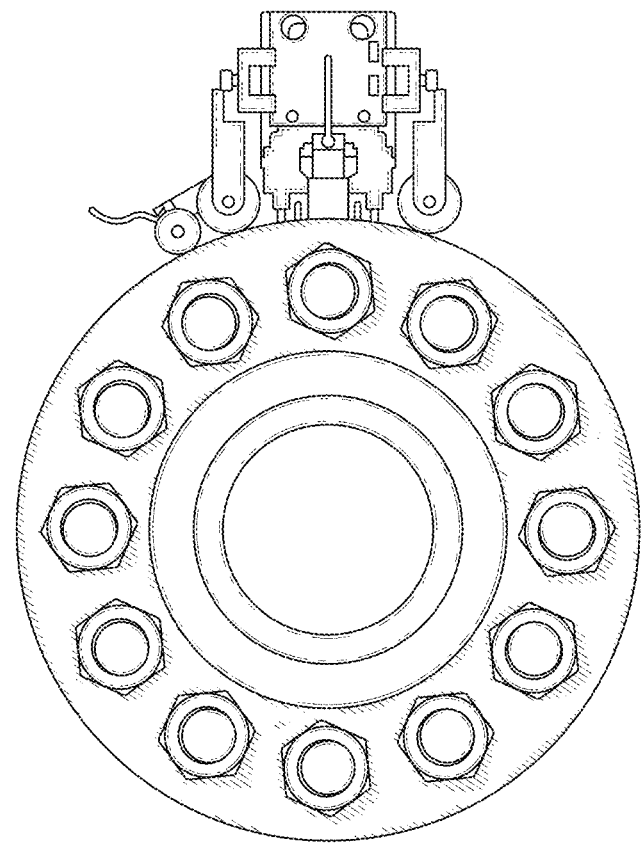
FIGS. 2A-2D depict checking the sealing surfaces of a flange joint using ultrasound technology according to the related art.
Figure 2B:
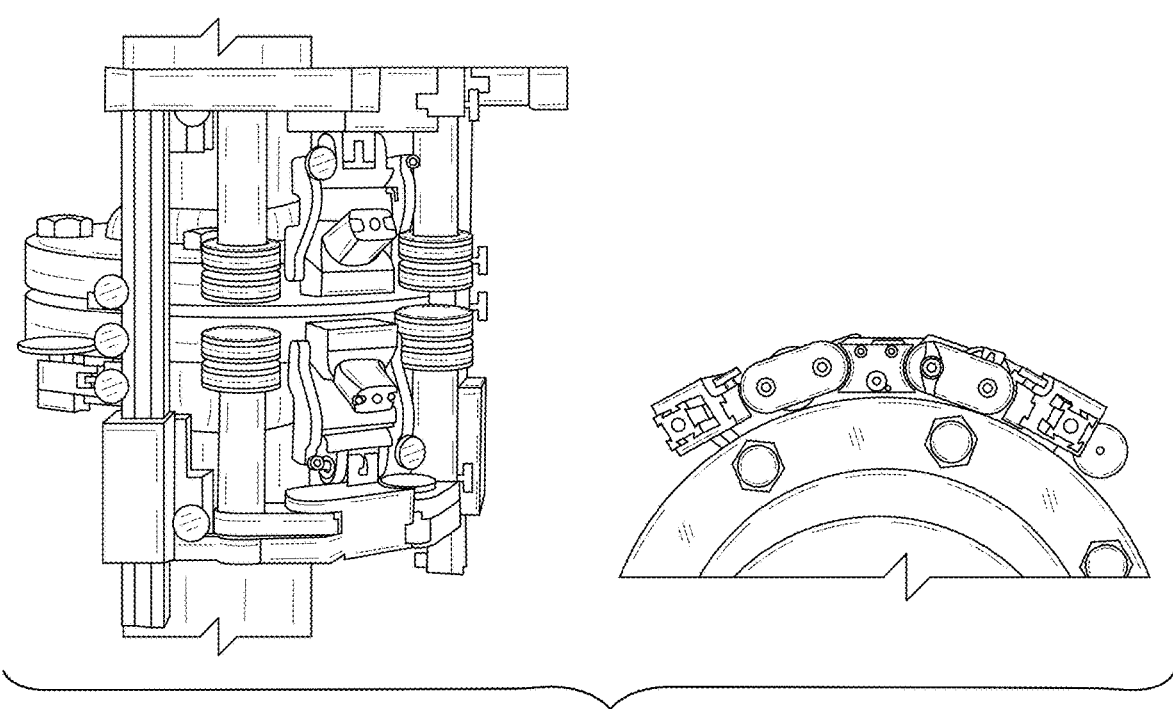
Figure 2C:
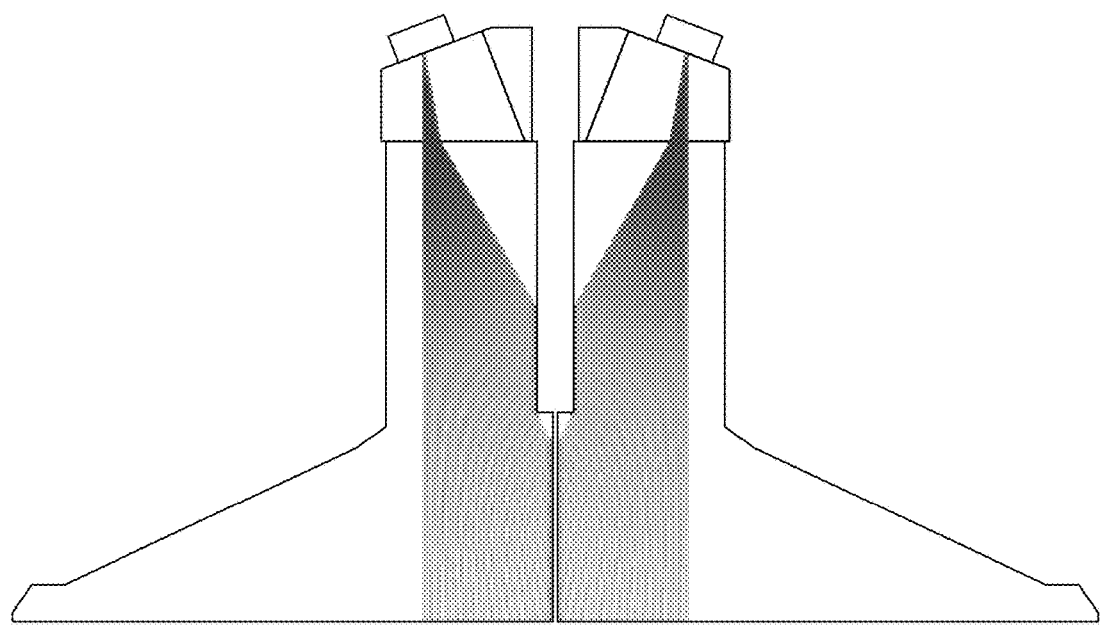
Figure 2D:
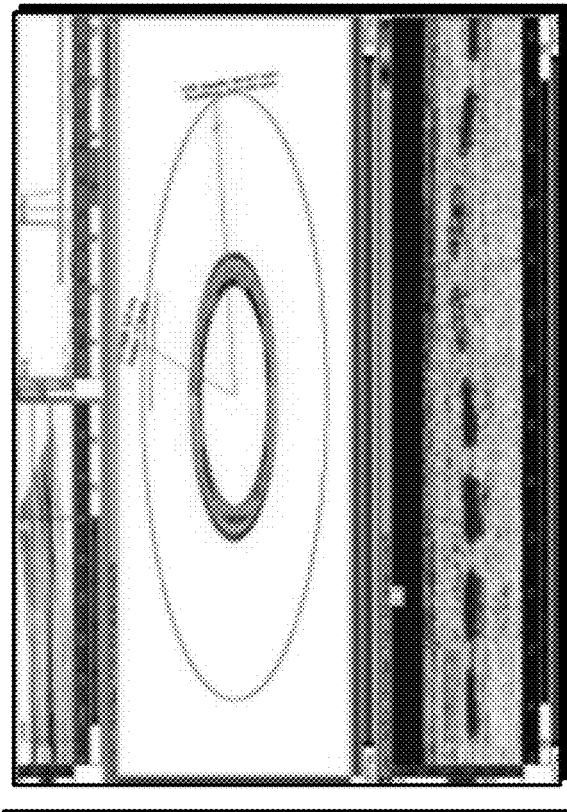
Figure 2D:
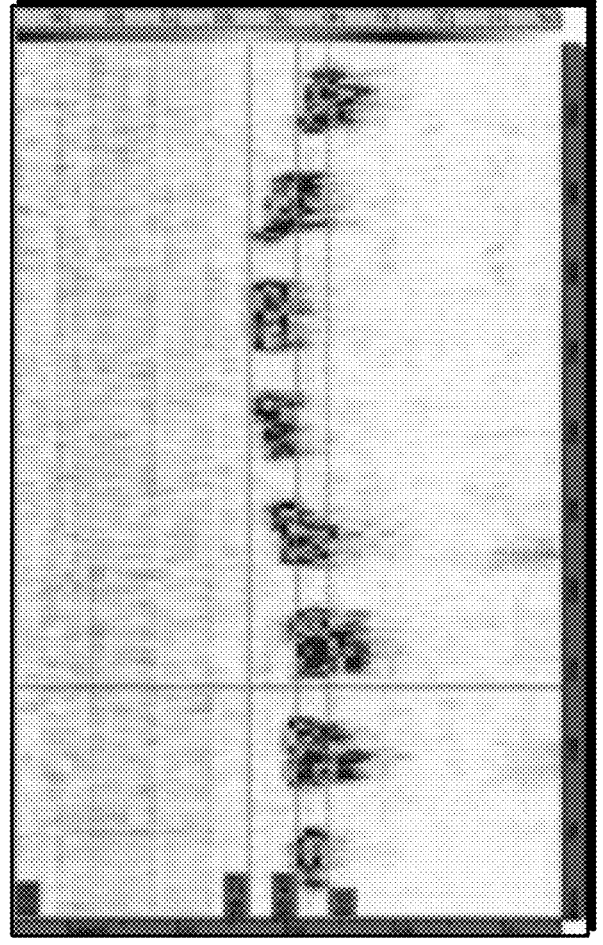
Figure 3A:
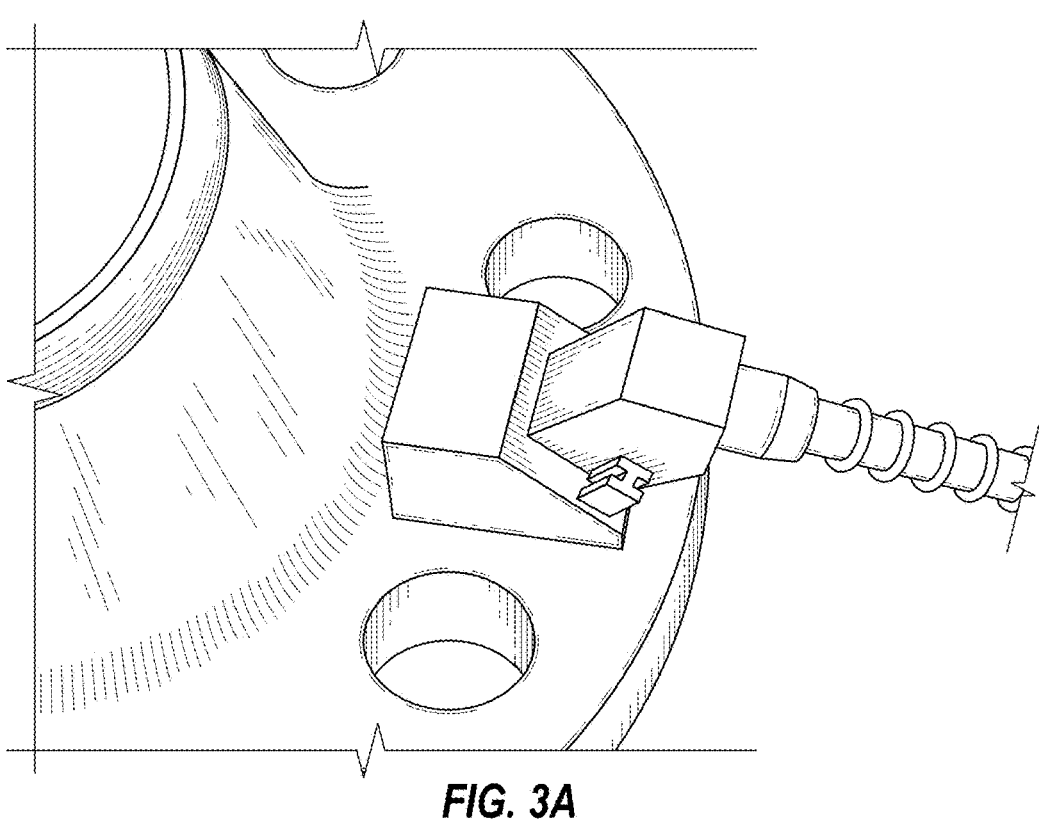
FIGS. 3A-3C depict use of an ultrasonic probe according to the related art.
Figure 3B:
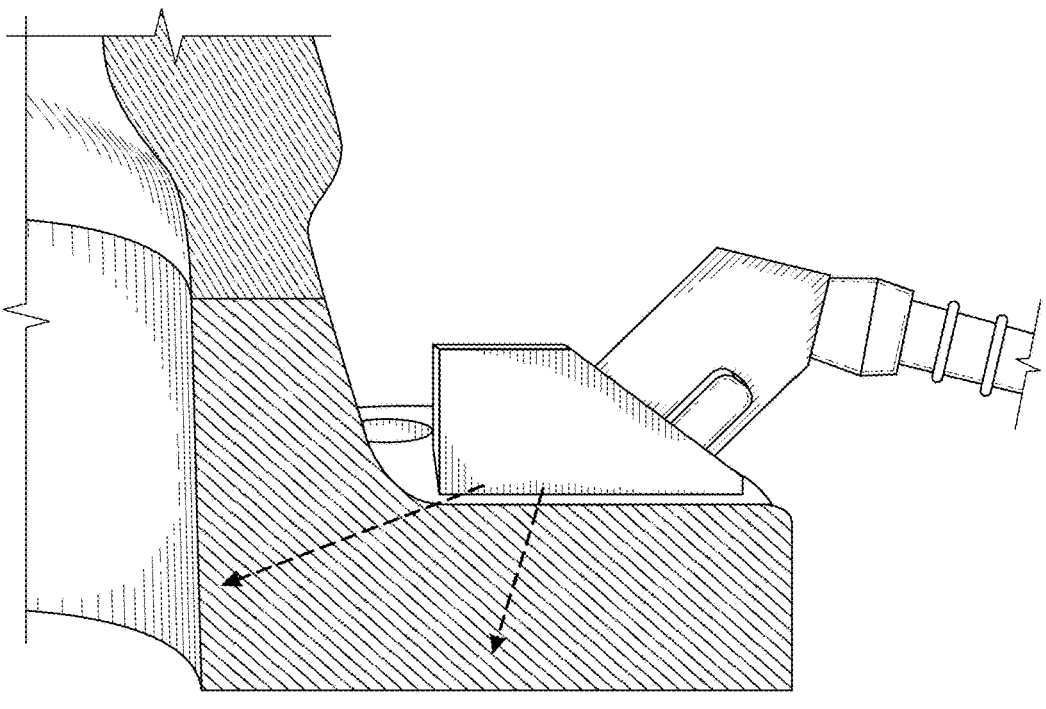
Figure 3C:
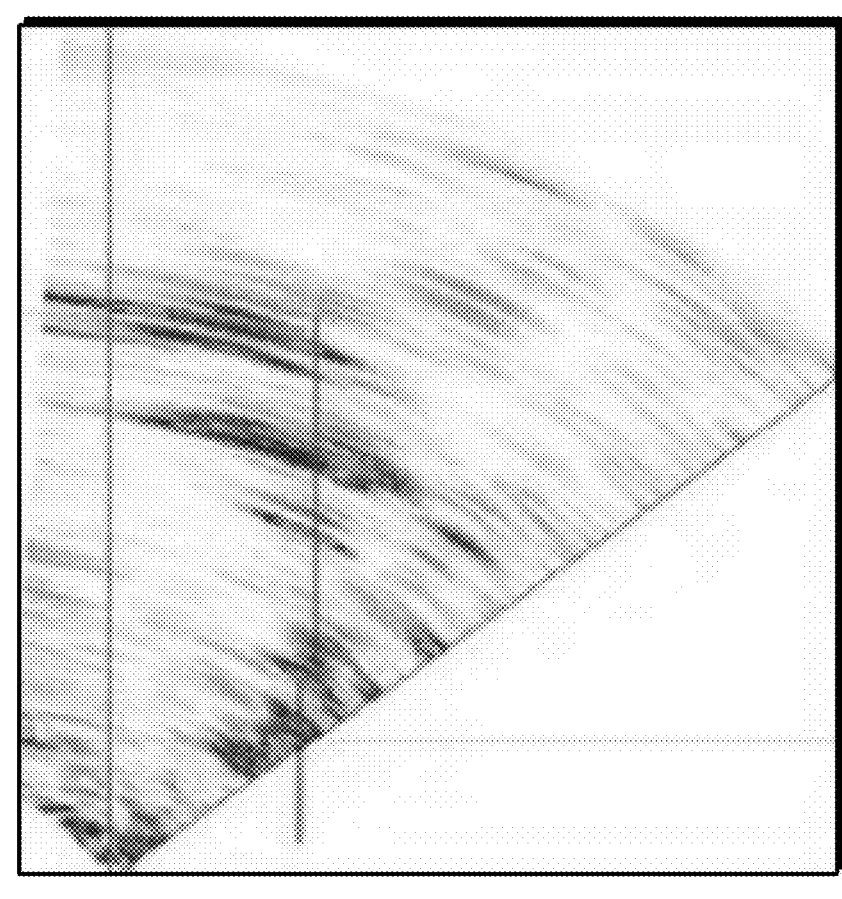
Figure 3C:
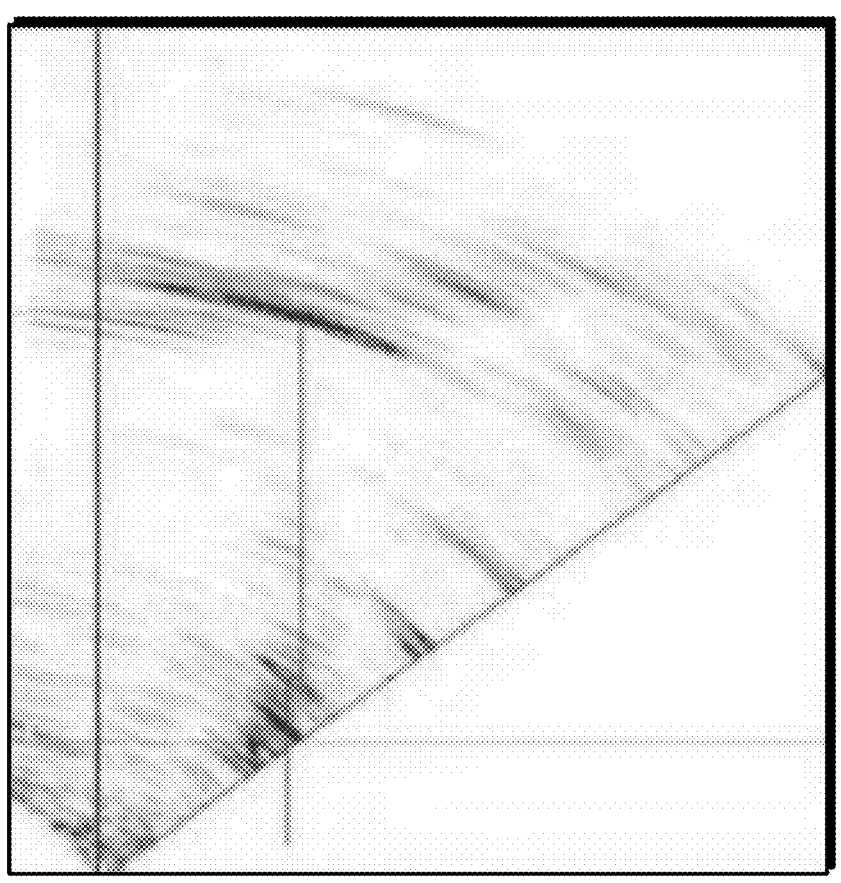
Figure 4A:
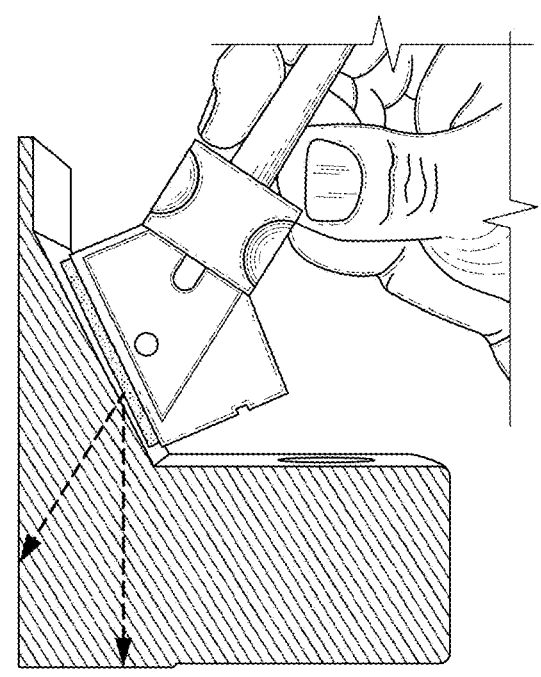
FIGS. 4A-4B depict placement of an ultrasonic probe according to the related art.
Figure 4B:
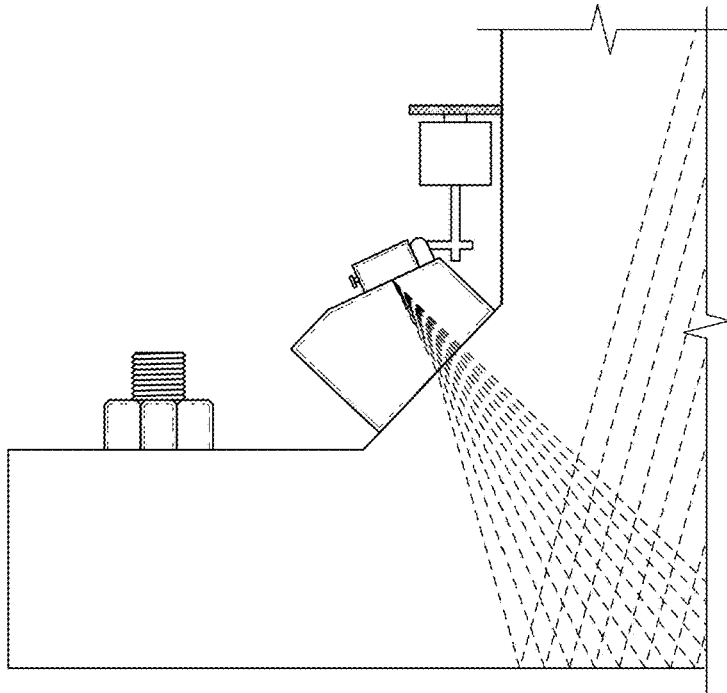
Figure 5A:
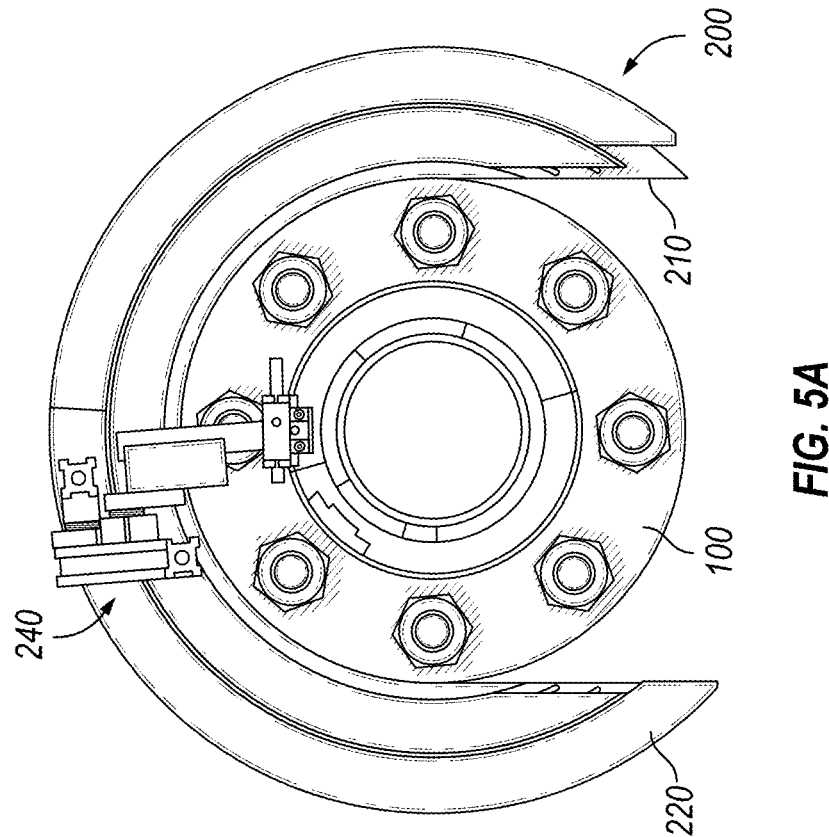
FIG. 5A depicts a front side view of a clamp scanner according to an example embodiment.
Figure 4C:
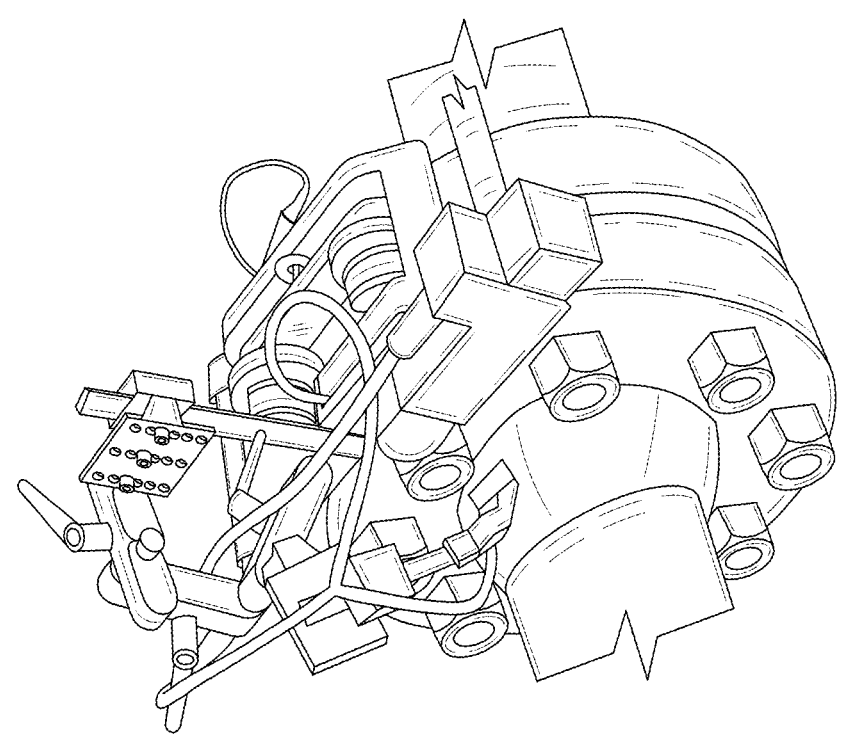
FIG. 4C depicts an ultrasonic probe as part of a mechanical apparatus according to the related art.
Figure 5C:
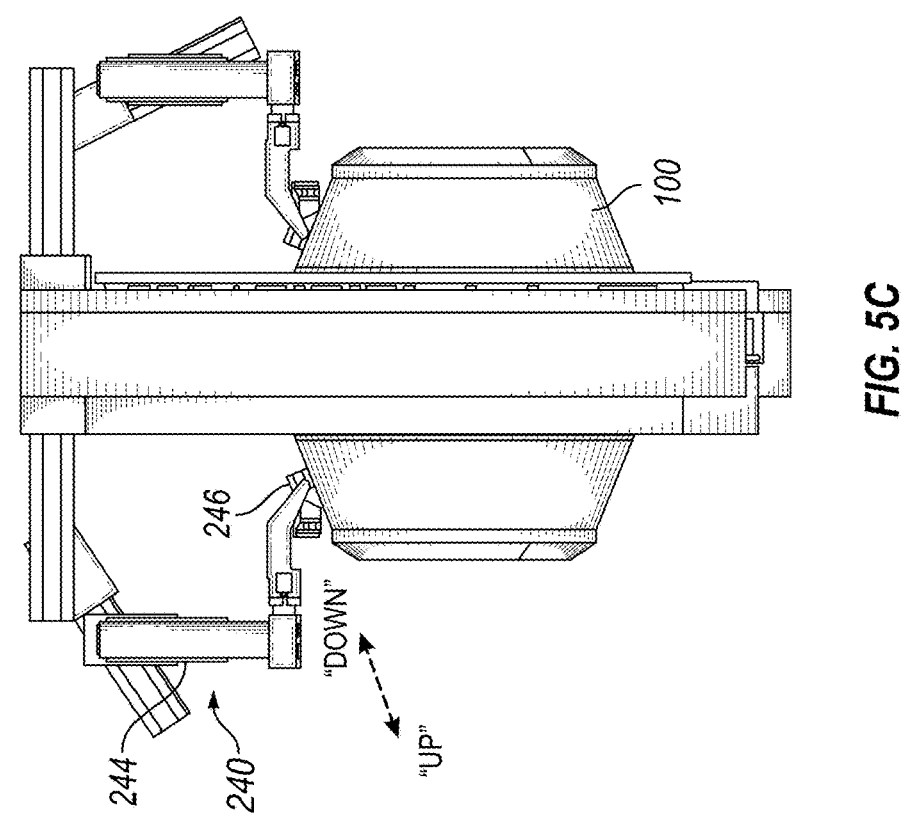
FIG. 5C depicts a right side view of a clamp scanner according to an example embodiment.
Figure 5B:
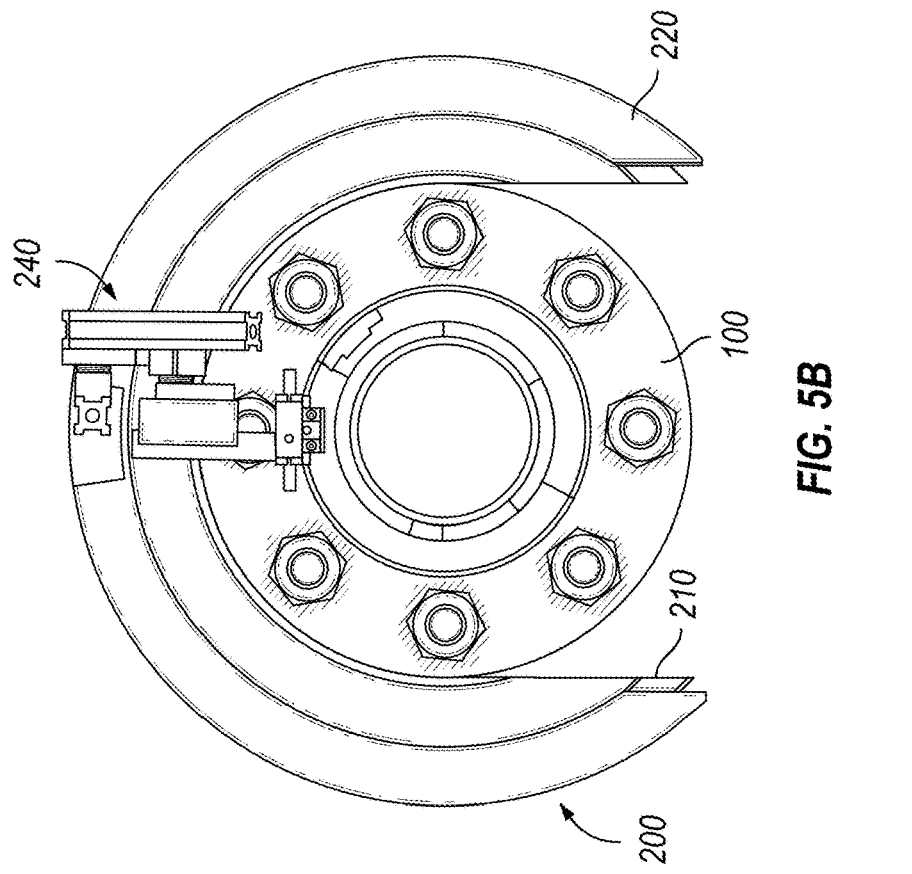
FIG. 5B depicts a back side view of a clamp scanner according to an example embodiment.
Figure 5E:
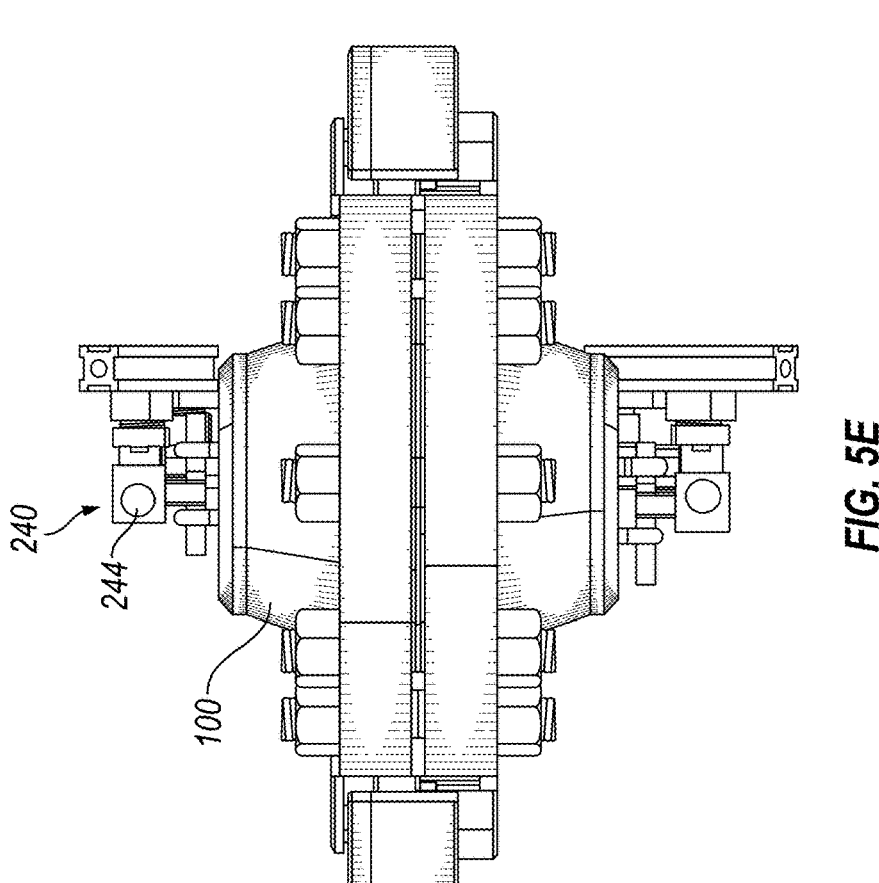
FIG. 5E depicts a top side view of a clamp scanner according to an example embodiment.
Figure 5D:
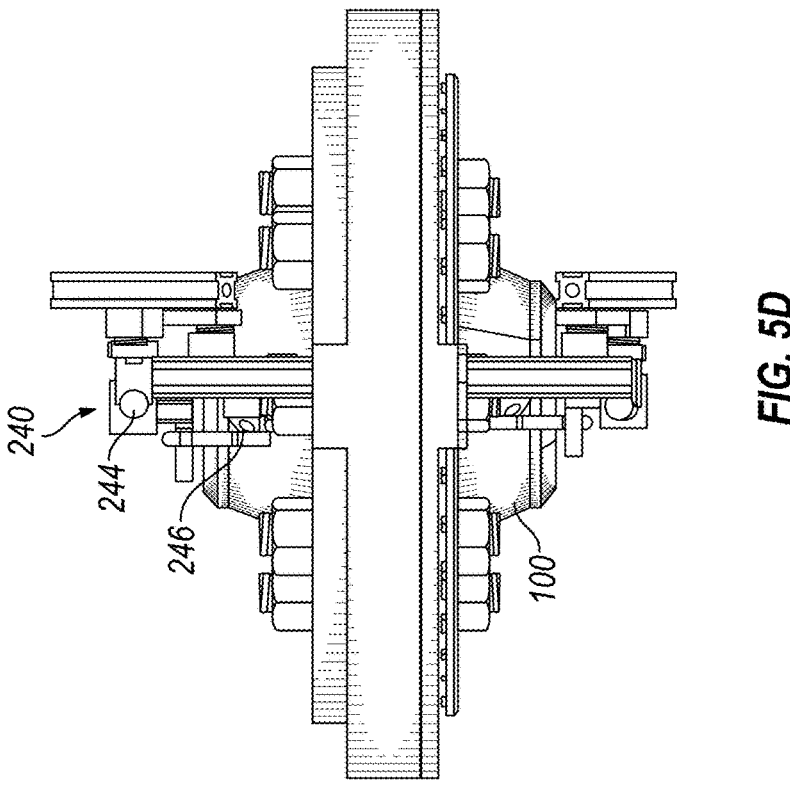
FIG. 5D depicts a top side view of a clamp scanner according to an example embodiment.
Figure 5G:
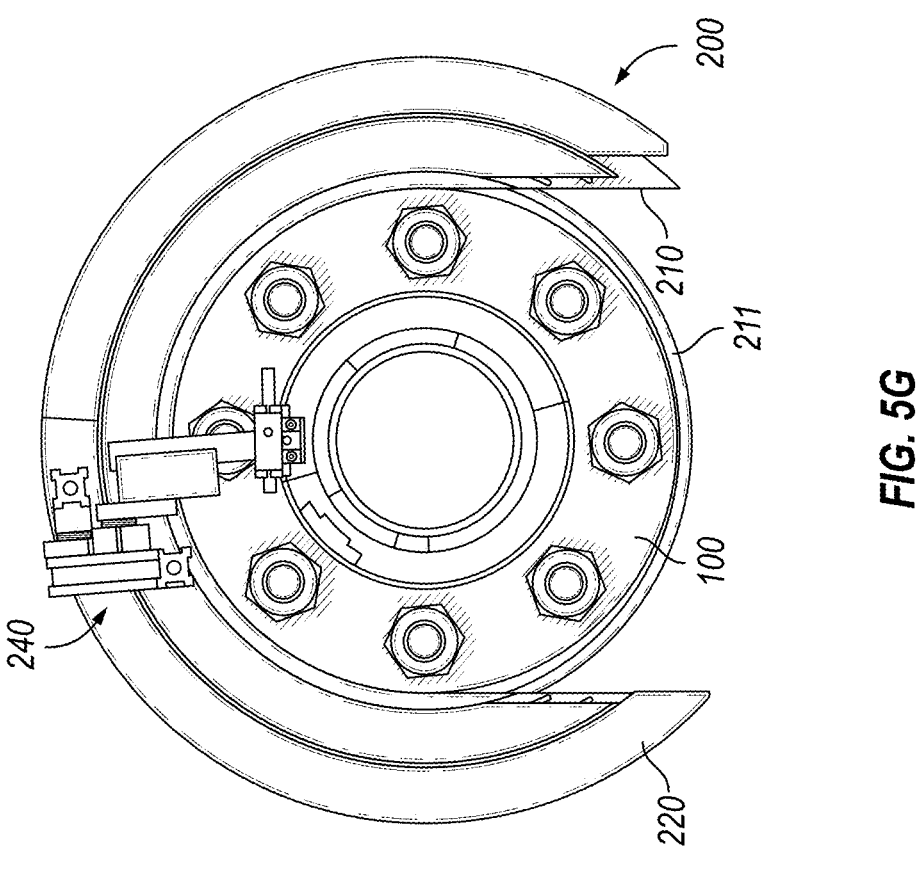
FIG. 5G depicts a front side view of a clamp scanner including clamp member according to an example embodiment.
Figure 5F:
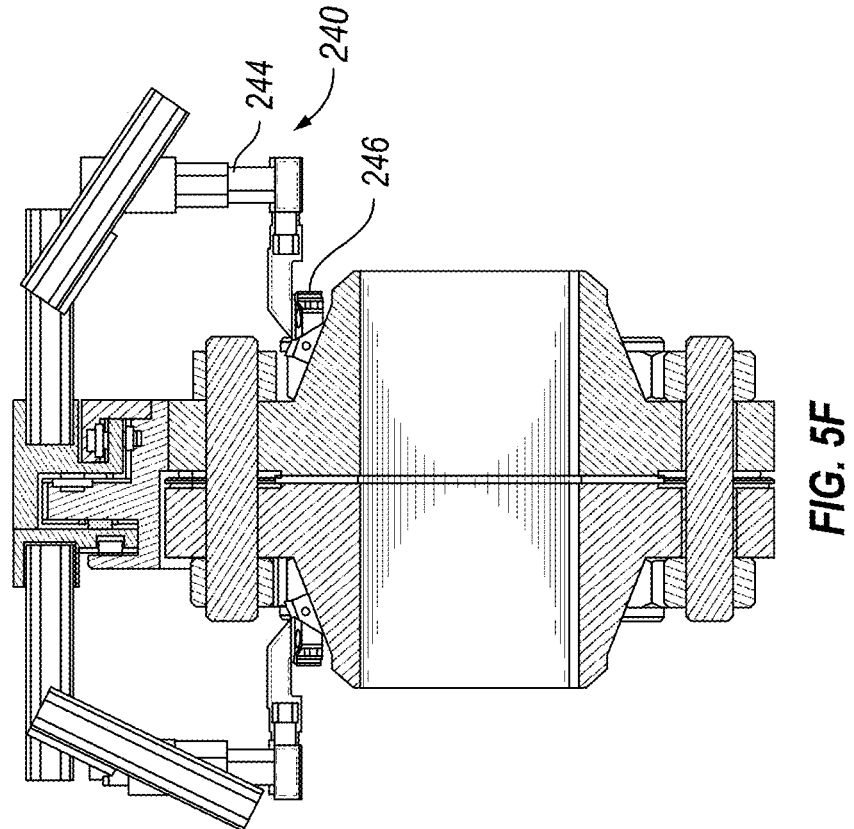
FIG. 5F depicts a cross-section view of a clamp scanner according to an example embodiment.
Figures 6A, 6B, 6C, 6D, 6E, 6F:
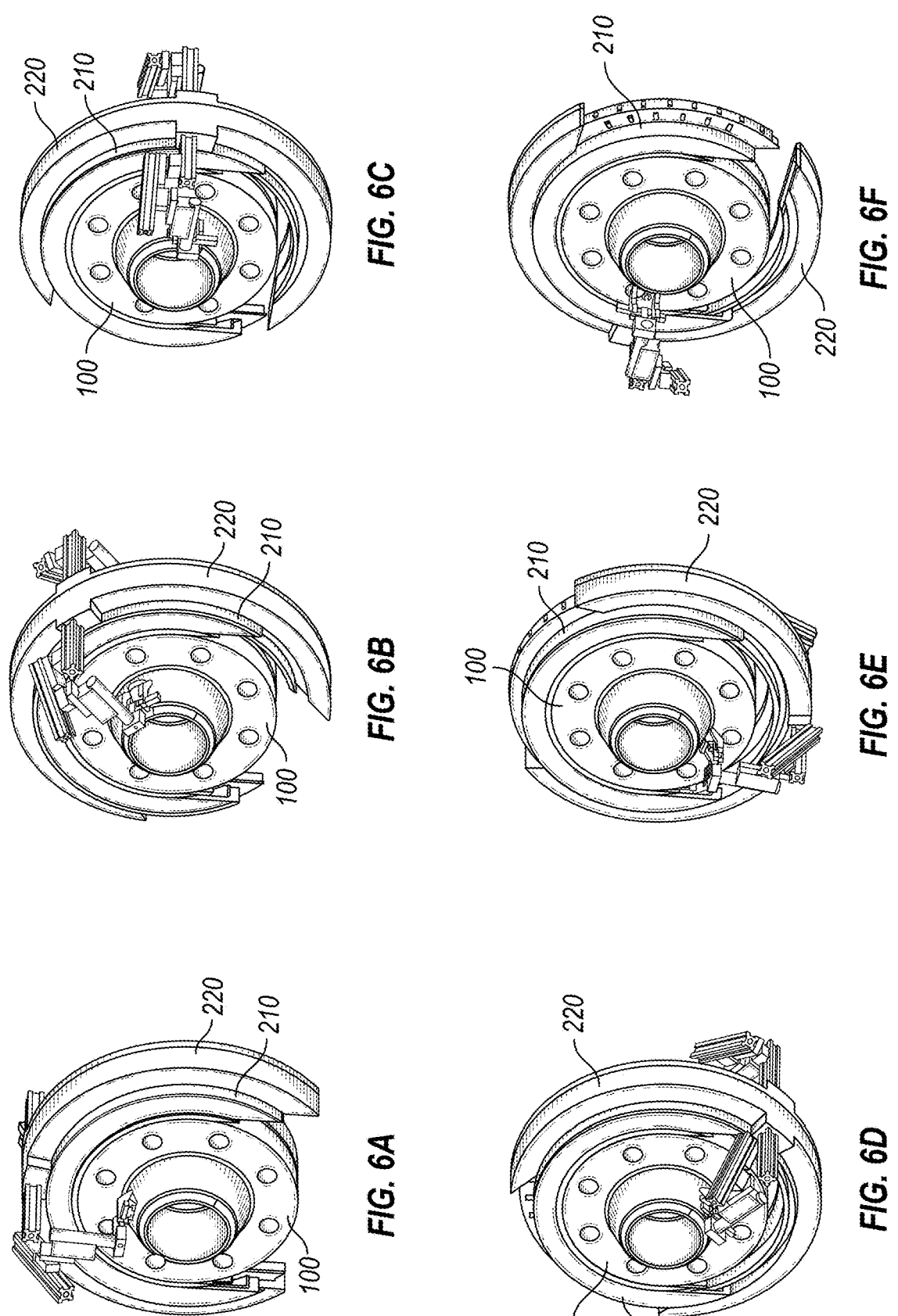
FIGS. 6A-6F depict the rotating movement of an outer inspection assembly mount portion of a clamp scanner according to an example embodiment.

Embodiments of the present disclosure may provide a corrosion mapping system, apparatus, and method for detecting, mapping out, measuring, quantifying, and monitoring material wall loss from the sealing surface of a flange, such as a raised face flange (e.g., a raised face weld neck flange as shown in FIG. 1B), as may be used in a flange joint. Embodiments may provide for a lightweight and relatively compact solution for accurately and quickly detecting flange scaling surface corrosion.

FIGS. 5A-5G illustrate an example clamp scanner 200 according to embodiments of the present disclosure. As shown in the example of FIGS. 5A-5G, the clamp scanner 200 may be mounted on a flange joint 100, which in the example shown may be a four-inch flange, and which may include two flanges scaled together with nuts and bolts and a gasket therebetween.

The clamp scanner 200 may have a gap sized to the flange diameter such that in the initial state of the clamp scanner 200 shown in FIGS. 5A-5G, the clamp scanner 200 may be mounted on the flange joint 100. In embodiments, the clamp scanner 200 may include an inspection assembly support ring having an inner arc portion 210 and an outer inspection assembly mount portion 220, both with a gap for mounting the clamp scanner 200 to the flange joint 100. The clamp scanner 200 may also include circuitry (e.g., a circuit) 300 as described herein.

The inner arc portion 210 may have an inner diameter structured to mount on the edge of the flange joint 100 (e.g., at both sides of the flange joint or around a partial circumference of the flange joint), and a clamp member 211 (illustrated by example in FIG. 5G) structured to fixedly couple the clamp scanner 200 to the flange joint 100. In some embodiments, the clamp member 211 may include a belt, such as a compression latch buckle, that may be manually tightened around the flange joint 100.

The outer inspection assembly mount portion 220— which may, for example, be a rotationary disc—may be rotationally coupled to the inner arc portion 210, and may include or have mounted thereon an inspection assembly 240 comprising one or more arms including a pivot arm 244 and a probe 246. The probe 246 may include an amplitude-based UT sensor and/or a phased array of UT sensors (which may be termed a PAUT sensor). As described herein, the probe 246 may be selected based on the flange design, ultrasound setup, etc. The inspection assembly 240 may be configured to engage a taper surface of the flange joint 100 with the probe 246. For example, the pivot arm may be adjusted for the probe 246 to interface with a taper surface of the flange joint 100. In some embodiments, the clamp scanner 200 may include a laser-aided alignment system.

In an example embodiment where the probe 246 includes a PAUT sensor, the size of the phased array probe may be selected to be, e.g., from 3/8 inch to 1½ or even 2 inches, depending on the size of the flange, and may include 16 to 64 UT elements. Greater phases may mean more accuracy, but may also require a greater size of the probe 246, and the size of the selected flange joint 100 may impose restrictions on usable probe size. The example number of elements for the PAUT sensor is not limiting, and any number of elements may be present, for example from 4 to 256 UT elements. Furthermore, in some embodiments, aspects of the present disclosure may be utilized in embodiments that are not based on a phased array sensor, for example having one or more individual UT sensing elements.

In embodiments, and as illustrated in FIGS. 5A-5G, the clamp scanner 200 may include the inspection assembly 240 on opposing sides of the clamp scanner 200 to probe opposing sides of flange joint 100.

With reference to FIGS. 6A-6F, which illustrate the rotating movement of outer inspection assembly mount portion 220 relative to the rest of clamp scanner 200, in embodiments, the clamp scanner 200 may be a manual roll clamp scanner, and a user may manually turn the outer inspection assembly mount portion 220 about the flange joint 100 as the probe 246 interfaces with flange joint 100 to collect data. However, embodiments are not limited thereto. For example, in some embodiments, the outer inspection assembly mount portion 220 may be turned about the flange joint 100 through a motor or other automated method. The outer inspection assembly mount portion 220 (together with inspection assembly 240) may be the only portion of the clamp scanner 200 that rotates around the flange joint 100, while the remainder of the clamp scanner 200 remains fixed to the flange joint 100 as described herein. As shown by example in FIGS. 6B-6D, the outer inspection assembly mount portion 220 may cross the gap of the inner arc portion 210 and reengage with the inner arc portion 210 at the other side of the gap to complete the rotation.

In embodiments, the inspection assembly 240 may include a plurality of arms connecting from the outer inspection assembly mount portion 220 to the probe 246, which may be structured for the probe 246 to raster along the tapered surface of the flange joint 100. As described herein, the inspection assembly 240 may include the pivot arm 244, which may remain parallel (or at another fixed angle) between a first mounting arm of the inspection assembly 240 and a final arm that connects to the probe 246. Furthermore, the pivot arm 244 may remain perpendicular (or at another fixed angle) between the final arm that connects to the probe 246 and a flange mating surface with which the probe 246 interfaces. In embodiments, the pivot arm 244 and/or the remainder of the plurality of arms may be structured to provide for a mix of radial and/or axial movement, thereby providing for up and down movement of the probe 246 along the tapered surface of the flange joint 100 (e.g., as shown by the "UP" and "DOWN" arrow labels in FIG. 5C), to thereby raster the data and get full scan coverage of the sealing surface. In some embodiments, the pivot arm 244 and/or the remainder of the plurality of arms may be structured to provide an azimuthal component, for example, when inspection occurs as the inspection assembly 240 is rotated around the flange joint 100.

In some embodiments, the positioning of the probe 246 may be done manually or by using automation such as a motor. For example, a user may manually adjust the positioning of the probe 246 after one rotation of the probe 246 around the flange joint 100 in order to rasterize the data and get better scan coverage, or this positioning may be automated by a motor that controls the plurality of arms of the inspection assembly 240 through, e.g., the instruction of circuitry 300.

In embodiments, the clamp scanner 200 may include a first encoder, which may be separate from or included as part of an inspection conditions circuit 310 (discussed further with reference to FIG. 16), and structured to determine a flange position value, which may be an azimuthal position of the inspection assembly 240 along the flange joint 100, and which may be used by an algorithm as described by example herein (e.g., as embodied in circuitry 300 including inspection reporting circuit 330) to determine the thickness or corrosion mapping. For example, the first encoder may keep track of the inspection assembly 240's rotation along the flange joint 100 relative to a starting point of the interrogation or other reset point and may provide this tracking as the azimuthal position. In an example, the azimuthal position may be absolute or relative to the starting point of the interrogation. In an example, the first encoder may be mounted at or near base of the inspection assembly 240 or at another portion of clamp scanner 200 to determine azimuthal travel along the flange joint 100.

Furthermore, as described herein, the clamp scanner 200 may include a second encoder, which may be separate from or included as part of the inspection conditions circuit 310, and structured to determine a probe engagement angle value including at least one of a pivot angle of the pivot arm 244 or an engagement angle of the probe 246 with the tapered surface of the flange joint 100, which may also be used by the algorithm as described herein to determine the thickness or corrosion mapping. In an example, the second encoder may be mounted at, inside of, or near the pivot arm 244 or the probe 246.

The inspection conditions circuit 310 (e.g., including the first and/or second encoder) may be structured to interpret the flange position value, as may be provided by the first encoder, and the probe engagement angle value, as may be provided by the second encoder, and in some embodiments, to store the same in a non-transitory computer-readable storage medium. The flange position value and/or the probe engagement angle may be used in embodiments described herein (e.g., by the inspection reporting circuit 330) for determining the corrosion and by the inspection execution circuit 320. In embodiments, all or portions of the inspection conditions circuit 310 may be included on the pivot arm 244 or another portion of inspection assembly 240.

Furthermore, in embodiments, the clamp scanner 200 may include an inspection execution circuit 320, as described herein, to interrogate the sealing surface of the flange joint 100 in response to the flange position value and the probe engagement angle. For example, the inspection execution circuit 320 may use the flange position value and the probe engagement angle value to instruct the probe 246 to shoot ultrasonic waves and collect the data therefrom (e.g., while rotating around the flange joint 100 as described herein), while associating the resulting data with the corresponding flange position values and the probe engagement angle values at the time of interrogation, such data being used by the inspection reporting circuit 330 as discussed below.

In embodiments, the inspection assembly 240, including its plurality of arms, as well as the encoders described herein may be structured to provide for a mix of radial and/or axial movement and data as the probe 246 rasters along the tapered surface of the flange joint 100. Furthermore, in embodiments, the inspection assembly 240 may be structured to rotate together with outer inspection assembly mount portion 220 during inspection such that the encoders described herein (e.g., the first encoder) may account for an azimuthal component, as may be interpreted by the inspection conditions circuit 310.

In an example, the outer inspection assembly mount portion 220 may be rotated one way (e.g., a first direction) for a complete rotation around the flange joint 100 (e.g., 360 degrees, clockwise or counter-clockwise) while the probe 246 may ultrasonically interrogate the flange joint 100 (e.g., as instructed by circuitry 300 as described herein), have the probe 246's position interfacing with the tapered surface of flange joint 100 changed either manually, or automatically via a motor (e.g., "UP" or "DOWN" in FIG. 5C), then rotated the other way (e.g., a second direction, which may be opposite to the first direction), for a complete rotation while the probe 246 may ultrasonically interrogate the flange joint 100 (e.g., as instructed by circuitry 300 as described herein), to rasterize the data as described herein. In an example, to avoid the tangling of cables, a user or motor may rotate the outer inspection assembly mount portion 220 around the flange joint 100 for just one complete rotation (e.g., 360 degrees), then rotate the outer inspection assembly mount portion 220 back the other way for just one complete rotation to rasterize the data. In other examples, the flange joint 100 be may scanned multiple times by the clamp scanner 200 by multiple complete rotation(s) around the flange joint 100 in one or both directions, with the position of the probe 246 adjusted (e.g., "UP" or "DOWN" in FIG. 5C) at the end of or partway through each rotation in a first or second direction, to more completely capture and rasterize the data, including any interesting parts of the sealing surface. For example, the flange joint 100 may be scanned by the probe 246 while the probe 246 rotates around the flange joint 100 in a first direction, have its position on the tapered surface of the flange joint 100 adjusted, and then continue to rotate around the flange joint 100 in the first direction or a second direction to rasterize the data.

In some embodiments, as described above, the outer inspection assembly mount portion 220 may be turned manually by a user. In such embodiments, there may not be a need for a motor to turn the outer inspection assembly mount portion 220, which may be advantageous as a motor for such a purpose may require significantly extra space and expense for the clamp scanner 200 and also increase its complexity and weight. Even with a manual method, data complete enough to determine corrosion may be acquired in well under a minute (e.g., 40-50 seconds). However, embodiments are not limited thereto, and some embodiments may include a motor or other device for automatically turning the outer inspection assembly mount portion 220 of clamp scanner 200 about the flange joint 100.

The data collected by the circuitry 300 of the clamp scanner 200 may be stored locally on a non-transitory computer-readable storage medium that is part of the clamp scanner 200 (and in an example may be included as part of circuitry 300). In some embodiments, the data, which may be stored on the non-transitory computer-readable storage medium, may be streamed or otherwise transmitted to another device (e.g., through a network connection or through tethering) and interpreted thereon. In some embodiments, inspection reporting circuit 330 may be part of the circuitry 300 included in the clamp scanner 200, but embodiments are not limited thereto. For example, in some embodiments, the inspection reporting circuit 330 may be physically separate from the clamp scanner 200, and the data may be streamed or otherwise transmitted to the inspection reporting circuit 330 from the clamp scanner 200.

Figure 7B:
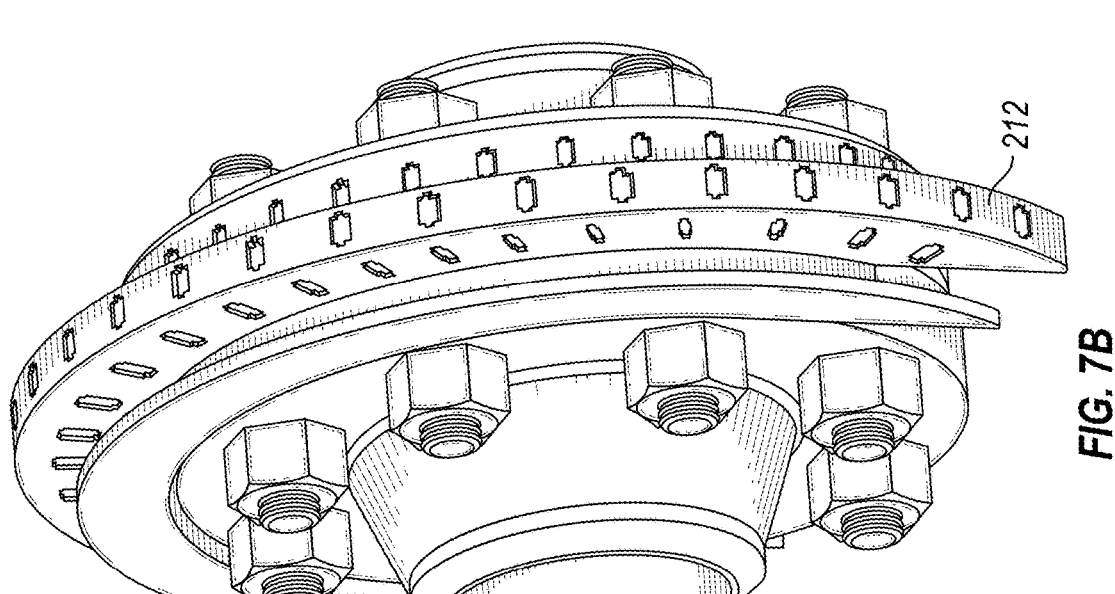
FIG. 7B depicts a back perspective view of a stationary base clamp according to an example embodiment.
Figure 7A:
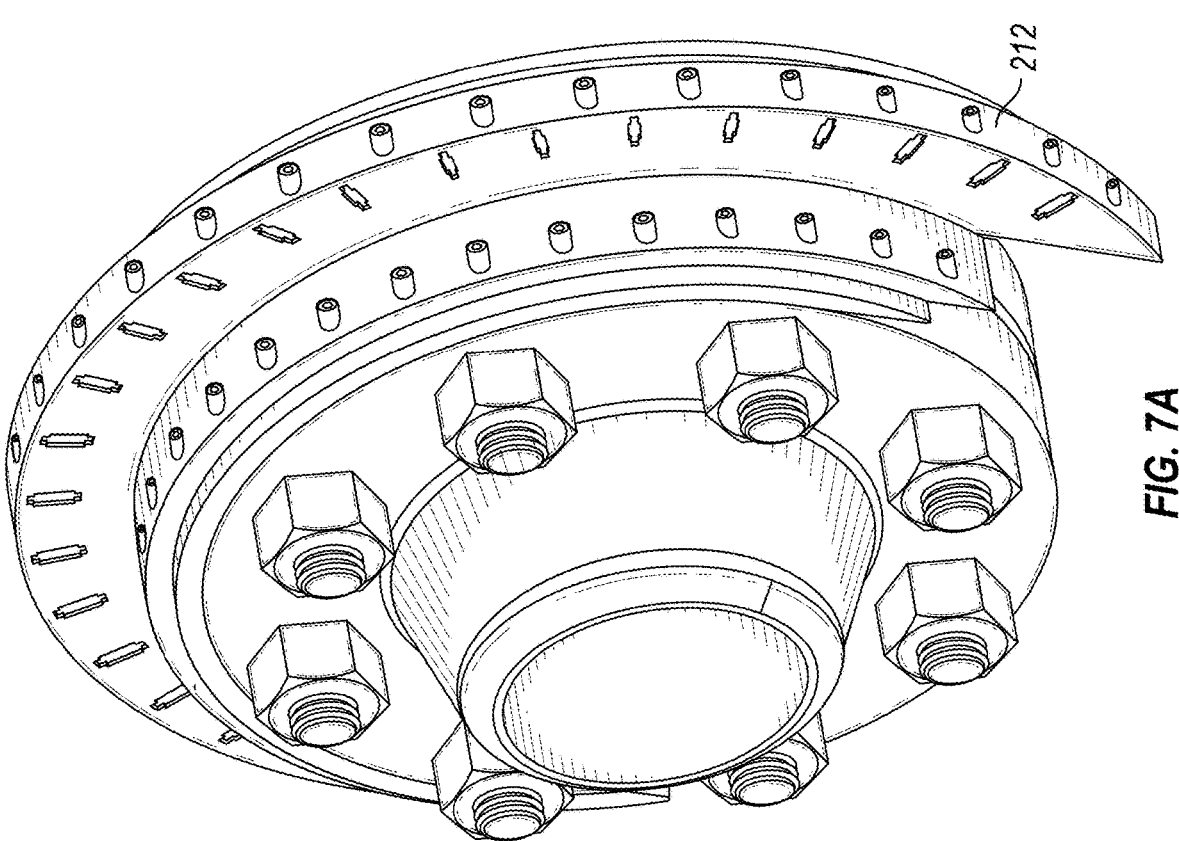
FIG. 7A depicts a front perspective view of a stationary base clamp according to an example embodiment.
Figures 7C, 7D:
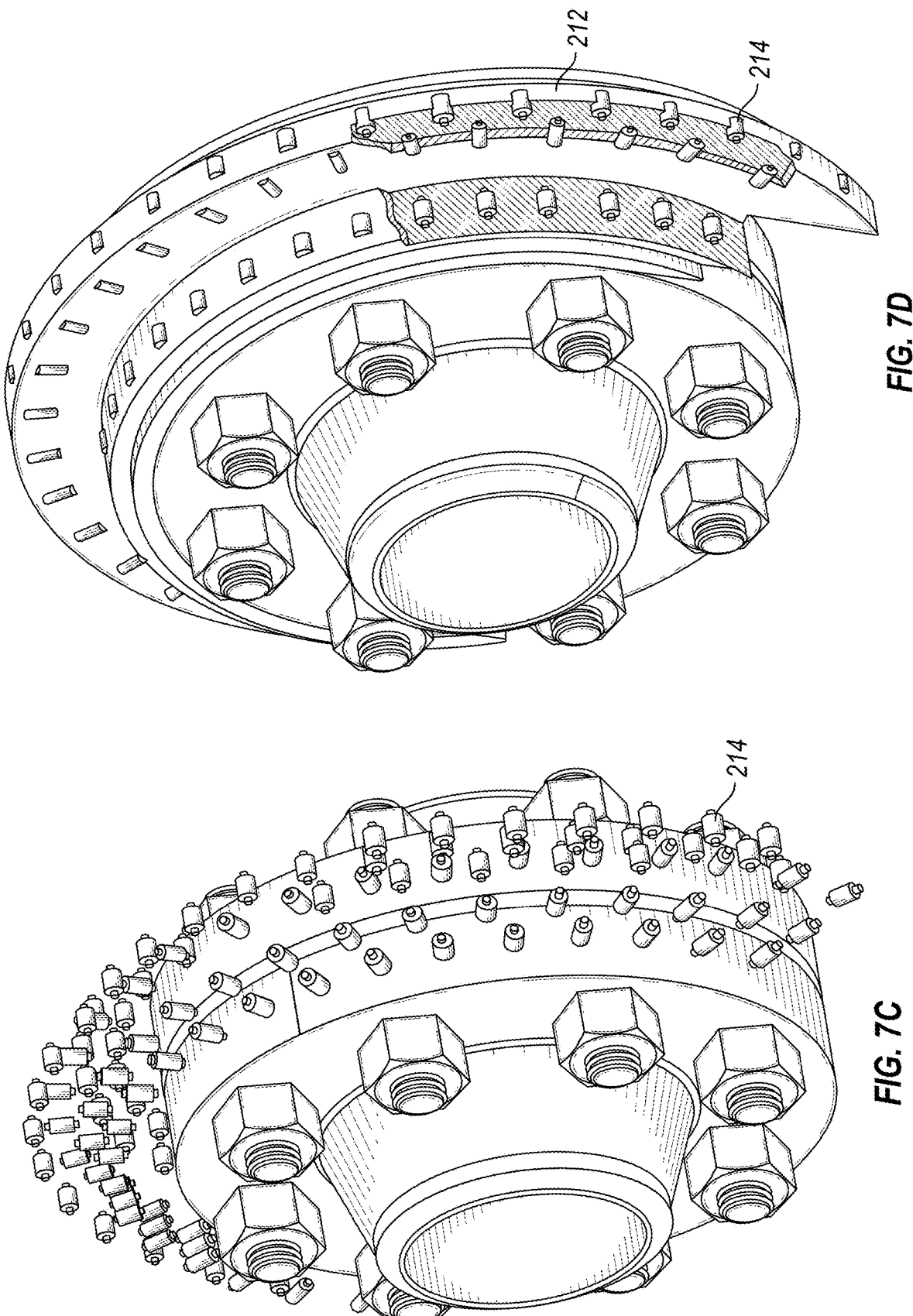
FIG. 7C depicts bearings of a stationary base clamp with the base clamp removed according to an example embodiment.
FIG. 7D depicts bearings of a stationary base clamp with a partial cut-away view of the base clamp according to an example embodiment.

FIGS. 7A-7M show the clamp scanner 200 in various deconstructed states according to embodiments. As described with reference to FIG. 6A, in embodiments, the clamp scanner 200 may include an inspection assembly support ring having an inner arc portion 210 and an outer inspection assembly mount portion 220. FIGS. 7A and 7B illustrate a stationary base clamp 212 of the inner arc portion 210, which may be mounted on the edge of the flange joint 100 through e.g., the clamp member 211 described herein. FIGS. 7C-7D illustrate bearings 214 with stationary base clamp 212 removed (FIG. 7C) and with stationary base clamp 212 having a partial cutaway view (FIG. 7D) to show the relative placement of the bearings 214, which may be displaced circumferentially at equal distances from each other. The bearings 214 may be interposed between the inner arc portion 210 and the outer inspection assembly mount portion 220. For example, bearings 214 may be included on the stationary base clamp 212 of inner arc portion 210 to reduce friction between the stationary base clamp 212 and the outer inspection assembly mount portion 220 as the outer inspection assembly mount portion 220 rotates around the flange joint 100.

Figure 7F:
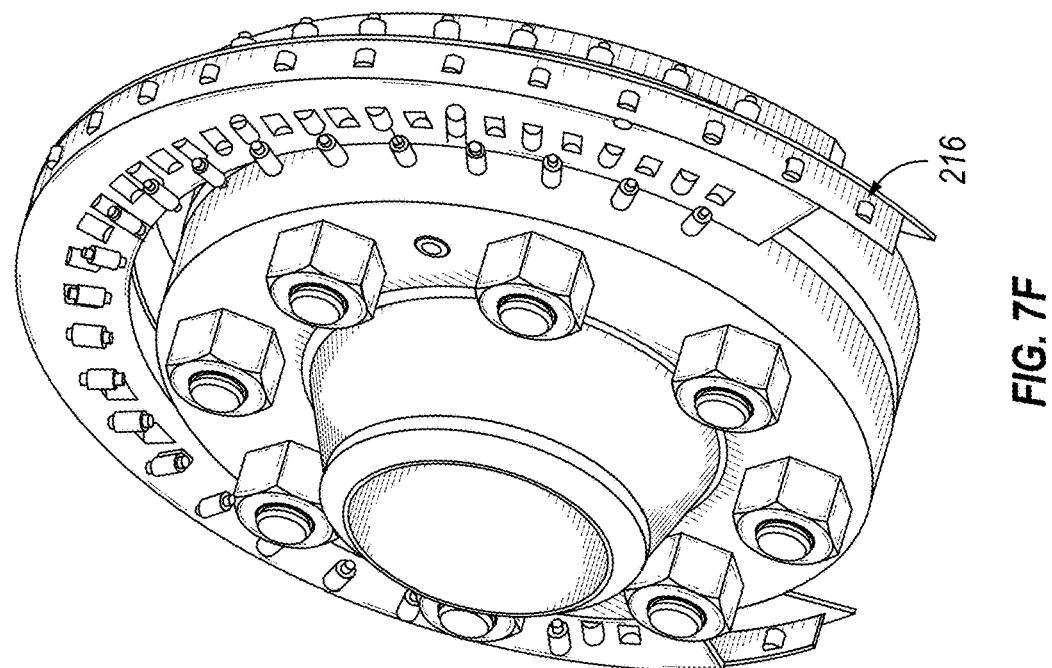
FIGS. 7E-7F depict a cover sheet to cover bearings on a stationary base clamp according to an example embodiment.
Figure 7E:
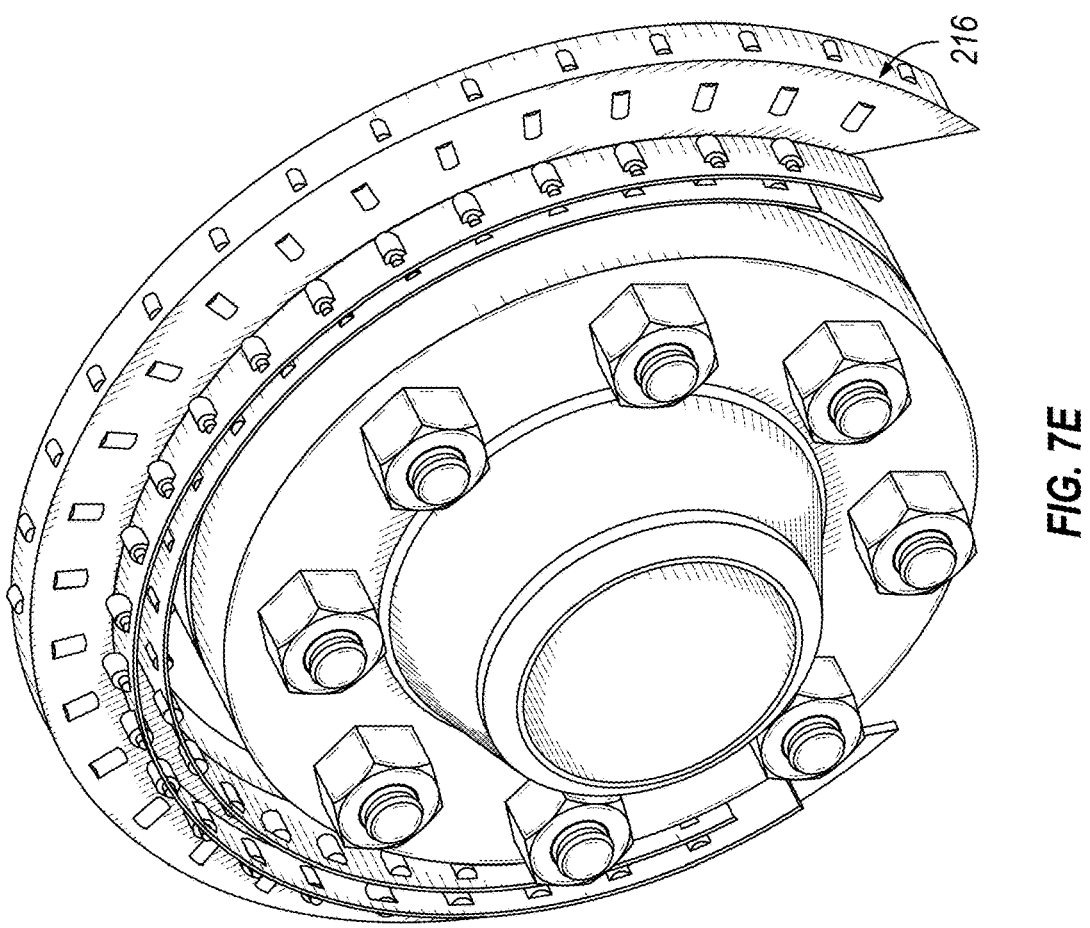
Figure 7H:
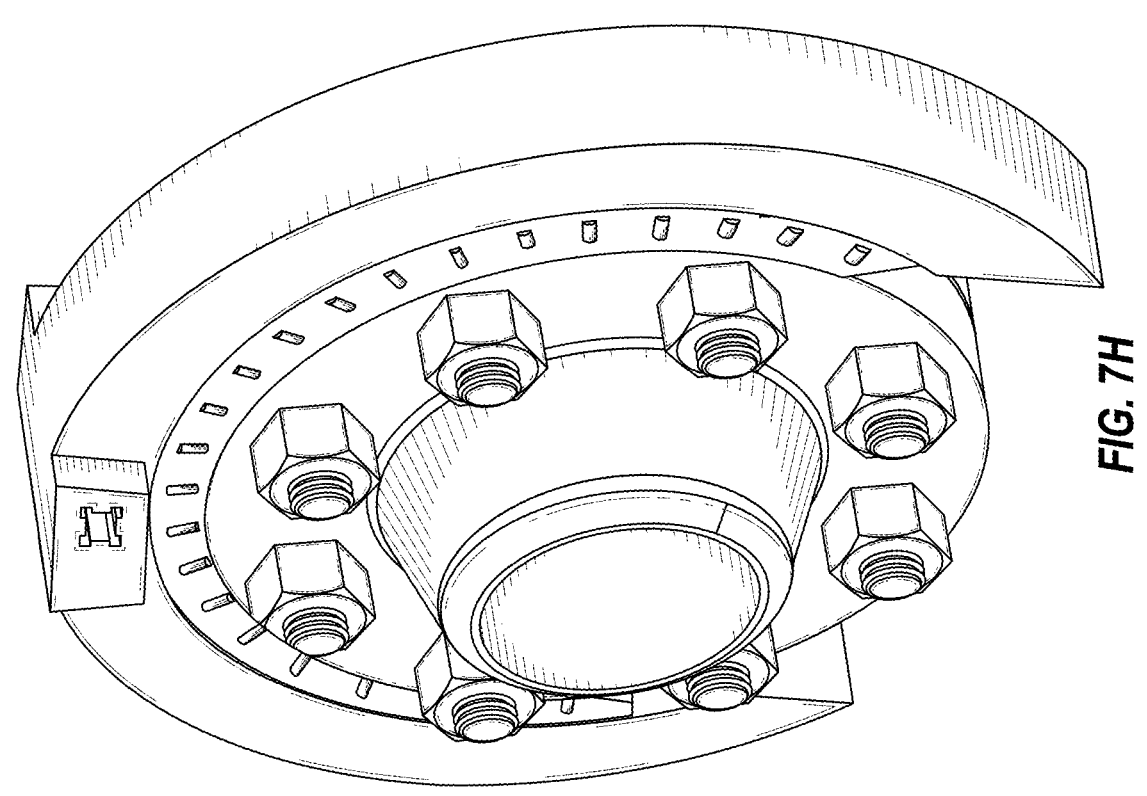
FIGS. 7G-7H depict an outer inspection assembly mount portion on an inner arc portion of a clamp scanner according to an example embodiment.
Figure 7G:
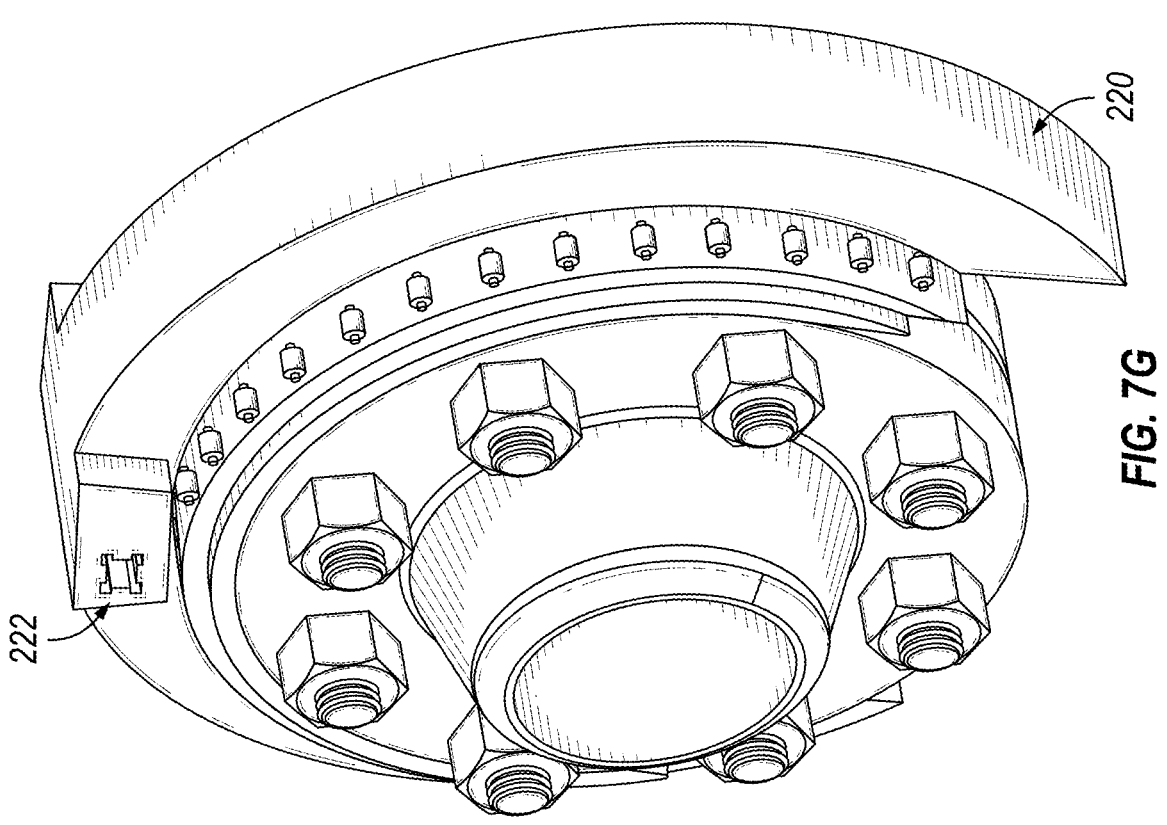

FIGS. 7E-7F illustrate a cover sheet 216 to cover the bearings 214 on stationary base clamp 212 and prevent them from falling off (e.g., by gravity). FIGS. 7G-7H illustrate the outer inspection assembly mount portion 220 (e.g., a rotationary disc) on the inner arc portion 210. As described herein, in embodiments, the outer inspection assembly mount portion 220 may move rotationally relative to the rest of the clamp scanner 200 during inspection. In some embodiments, and as illustrated in FIGS. 7G-7H, the inspection assembly 240 includes an arm that is mounted in a hole 222 of the outer inspection assembly mount portion 220. The outer inspection assembly mount portion 220 according to some embodiments may include holes 222 on each side for mounting inspection assemblies 240, one on each side of the inner arc portion 210, to enable use of two probes 246 at the same time, to inspect the opposing flanges of a flange joint.

Figure 7I:
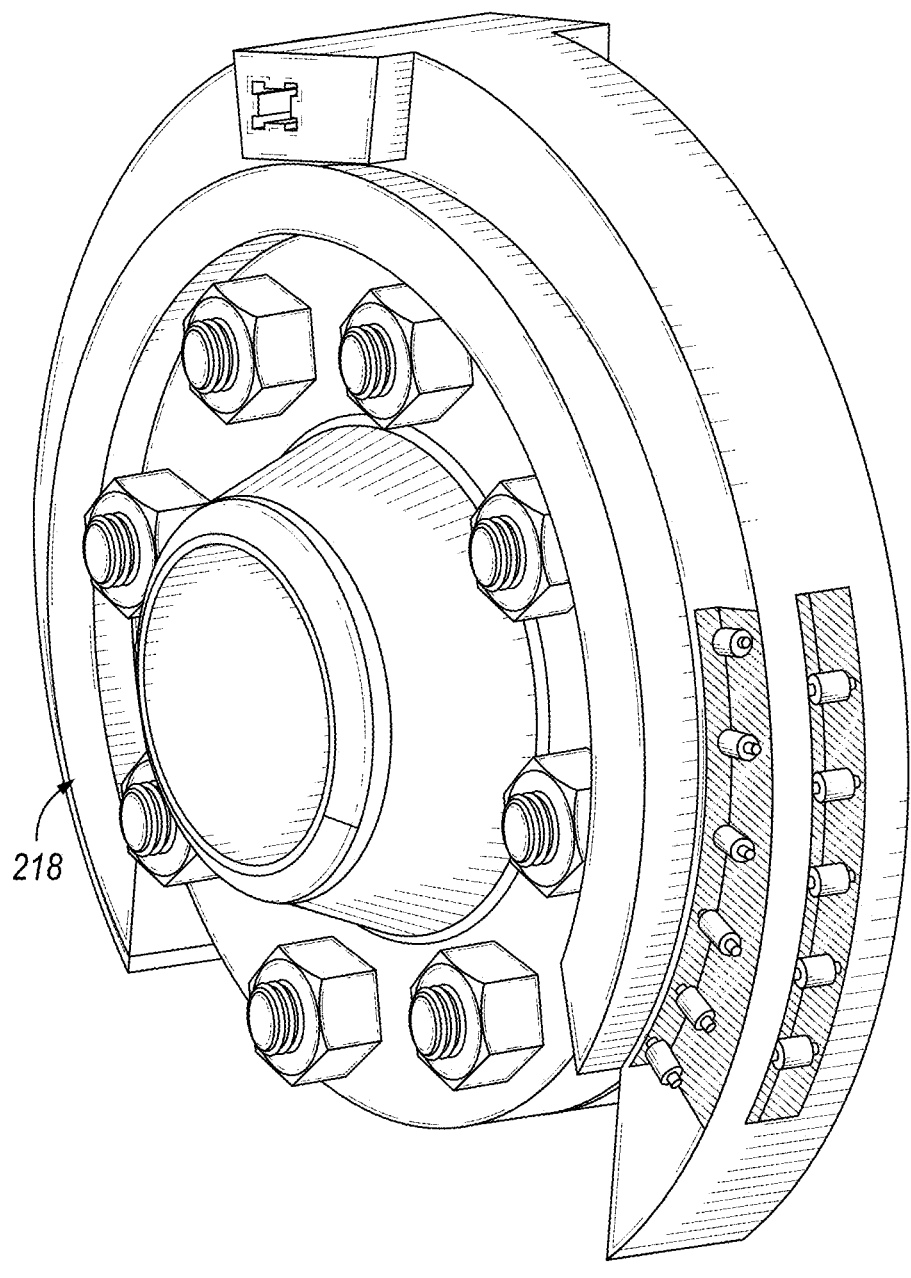
FIG. 7I depicts a base clamp cover with a partial cut-away view according to an example embodiment, which may cover the other parts of an inner arc portion.
Figure 7J:
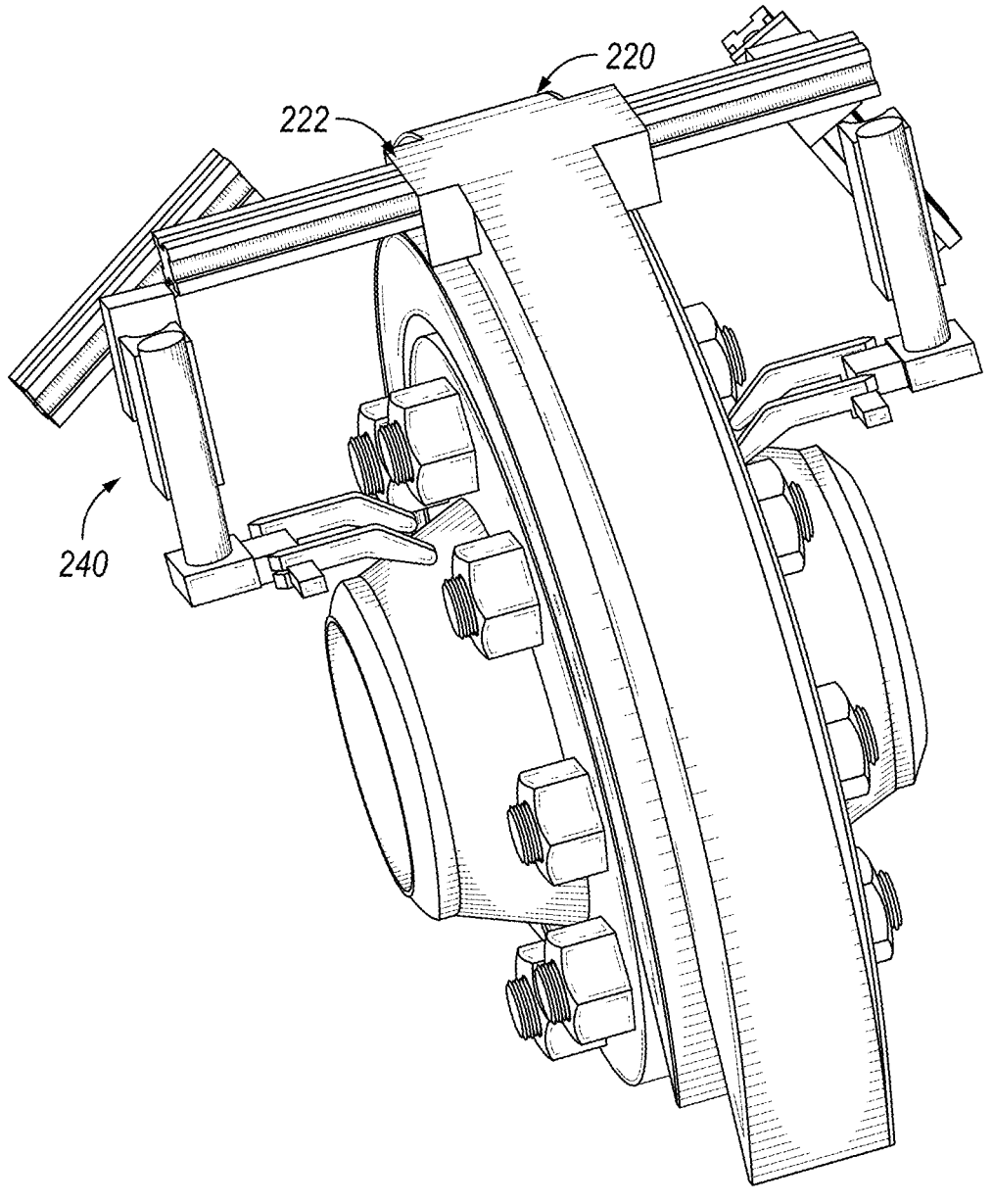
FIG. 7J depicts a clamp scanner with an inspection assembly according to an example embodiment.
Figure 7K:
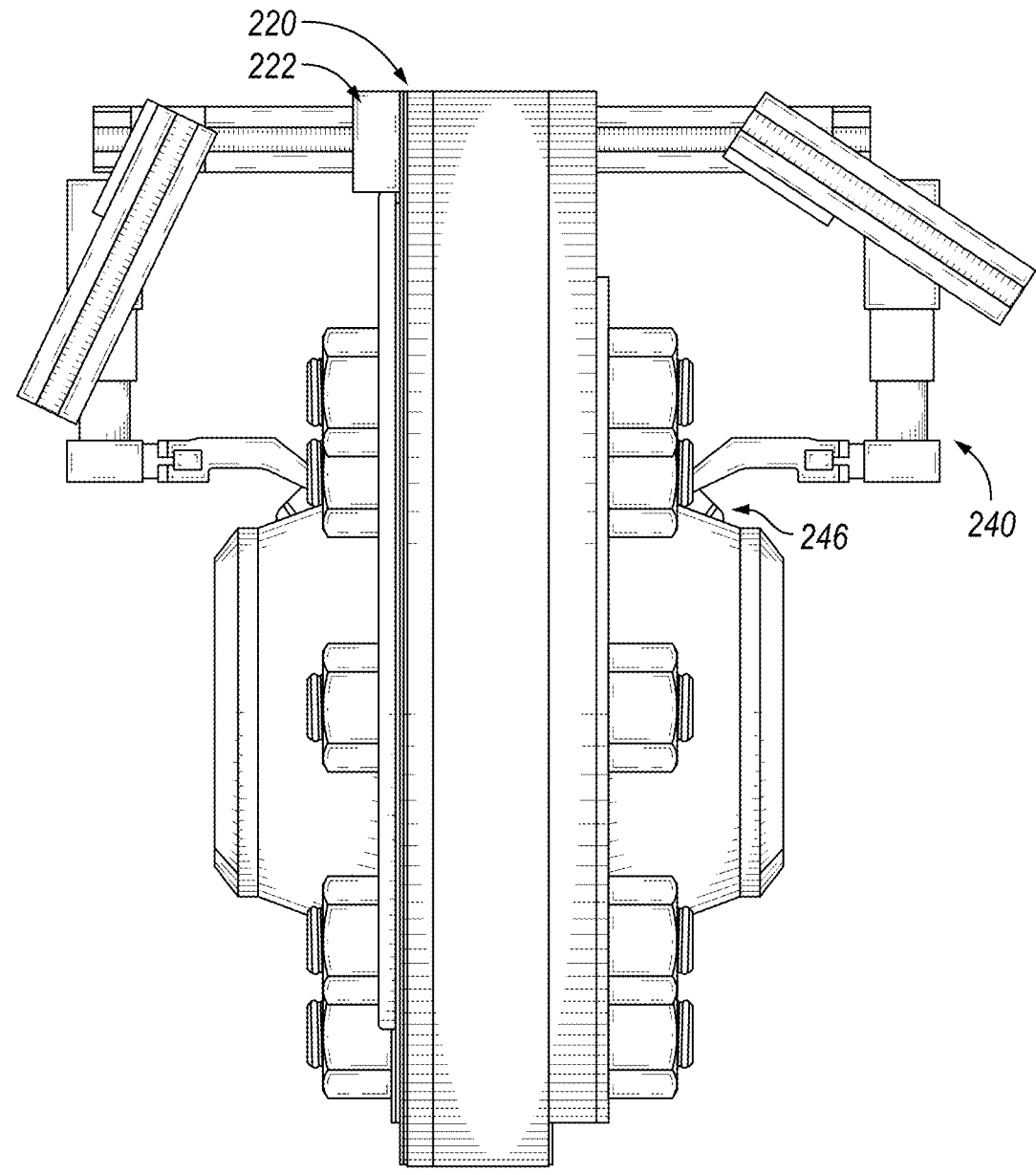
FIG. 7K depicts a clamp scanner with an inspection assembly according to an example embodiment.
Figure 7L:
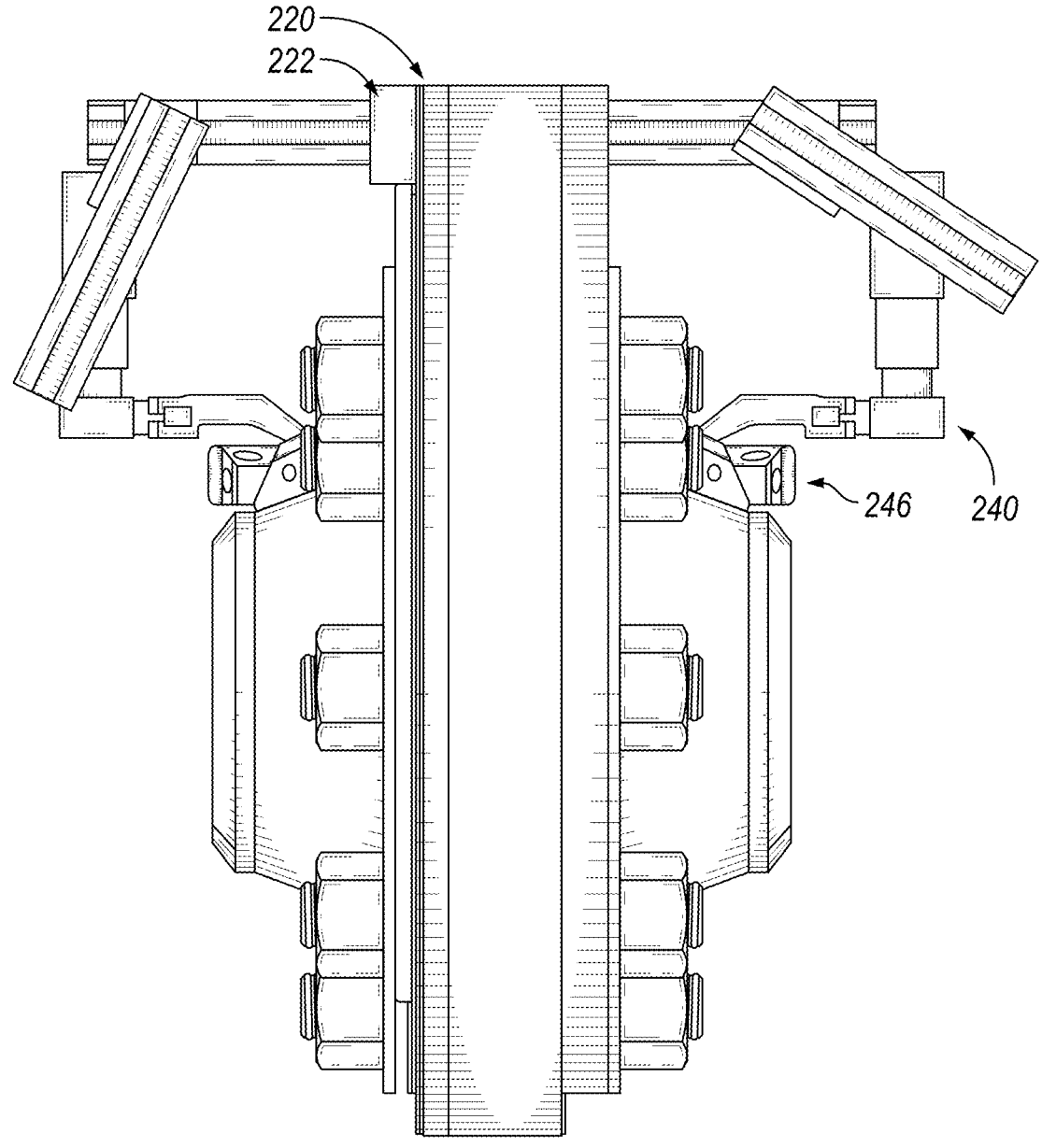
FIG. 7L depicts a clamp scanner with an inspection assembly according to an example embodiment.
Figure 7M:
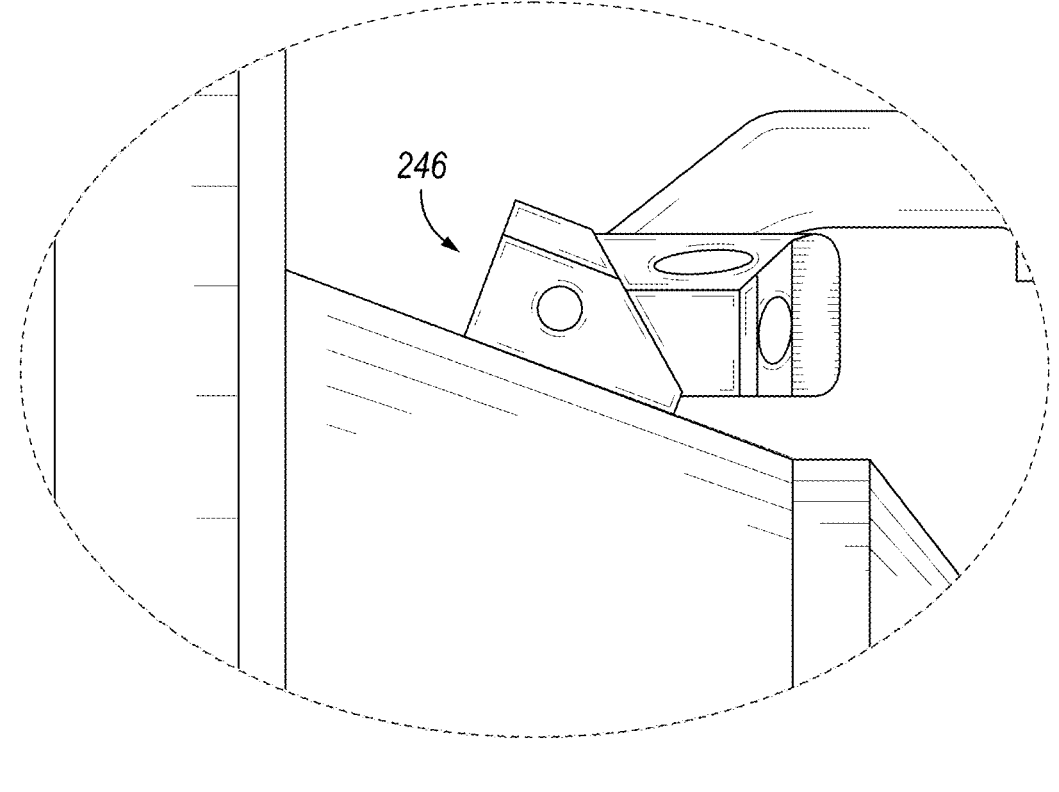
FIG. 7M depicts a close-up view of the phased UT array sensor probe of FIG. 7L according to an example embodiment.

FIG. 7I illustrates a base clamp cover 218, which may cover the other parts of the inner arc portion 210, and which may be stationary relative to the outer inspection assembly mount portion 220. FIGS. 7J-7L illustrate an inspection assembly 240 (e.g., probe holder) mounted on the outer inspection assembly mount portion 220. FIG. 7K additionally illustrates the probe 246 including a UT sensor, FIG. 7L additionally illustrates the probe 246 including a PAUT sensor, and FIG. 7M additionally illustrates a close-up side view of the probe 246 including a PAUT sensor.

The clamp scanner 200 may be sized for a particular-sized flange. For example, the clamp scanner 200 may be sized for a flange ranging in size from 1 to 8 inches, or from 1 to 10 inches, inclusive. For a vast majority of flanges currently in the market, e.g., around 95%, the clamp scanner 200 according to embodiments may only need about 2.5 inches of clearance from the flange, as opposed to related art, which in one example may require 6 inches or more of clearance.

The clamp scanner 200 according to embodiments herein may maintain a smooth, linear trajectory of the probe 246 as it moves around the flange joint 100. Indeed, because the inspection assembly 240 may rotate on bearings 214 of stationary base clamp 212, there may be little friction during the interrogation process other than from when the probe 246 touches the flange surface. Furthermore, owing to the structure as described for embodiments herein, the clamp scanner 200 may allow two opposing flange surfaces of the flange joint 100 to be inspected at the same time. By clamping onto the flange joint 100 and having the structure as described herein, the clamp scanner 200 may provide significant stability to the probe 246 as it moves along the flange, such that the probe 246 is independent of the flange surface, and paint and other irregularities on the flange surface may not have an impact on the UT interrogation.

Embodiments may include a corrosion mapping system, such as a raised face corrosion mapping ("RFCM") system, as may be embodied on circuitry 300 to detect, map out, measure, quantify, and monitor material wall loss from the sealing surface of the flange joint 100 (such as a raised face weld neck flange) using an algorithm that processes the ultrasound data from the probe 246 (e.g., UT or PAUT) as acquired from the tapered or angled neck of the flange joint 100. In some embodiments, such an algorithm may be included in the circuitry 300 described herein. For example, such an algorithm may be included in the inspection reporting circuit 330.

Figure 16:
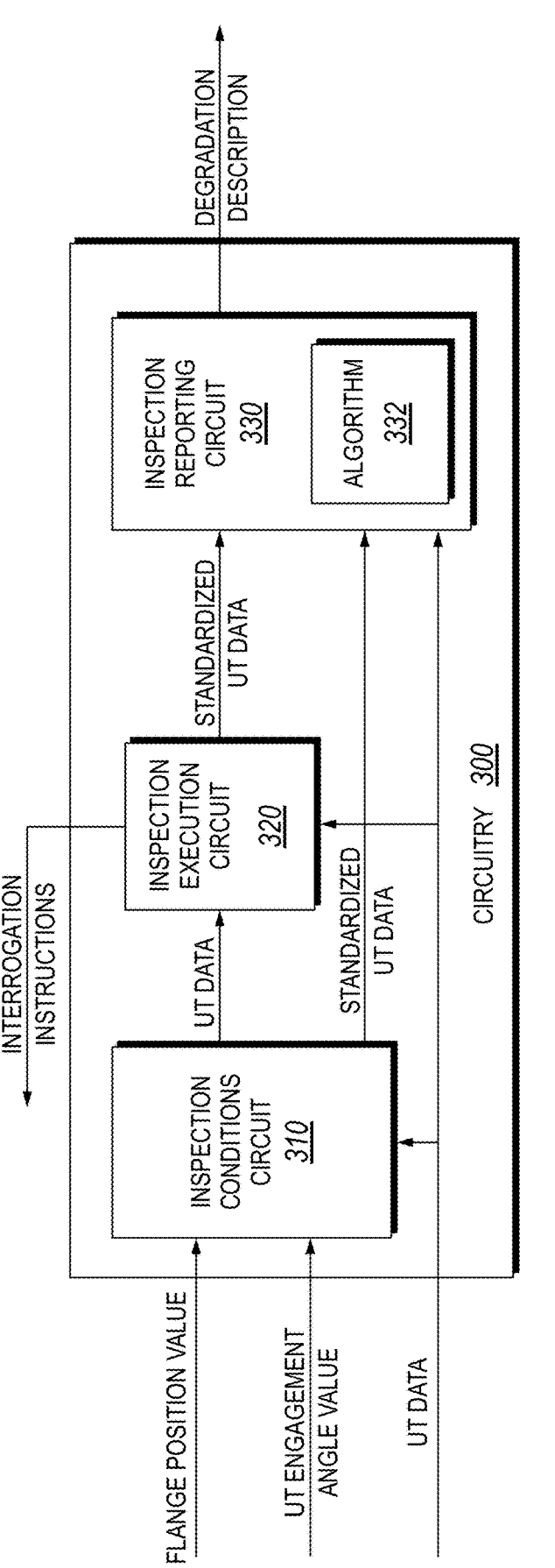
FIG. 16 depicts circuitry of a clamp scanner according to an example embodiment.

With reference to FIG. 16, in embodiments, the clamp scanner 200 may include all or any portion of the circuitry 300, including the inspection conditions circuit 310 structured to interpret a flange position value and a UT engagement angle value, the inspection execution circuit 320 structured to interrogate a flange scaling surface in response to the flange position value and the UT engagement angle (e.g., by instructing the probe 246), and the inspection reporting circuit 330 structured to provide a degradation description in response to the interrogating. In providing the degradation description in response to the interrogating, the inspection reporting circuit 330 may include a corrosion mapping algorithm 332 for the corrosion mapping system as described herein.

The data from interrogation (e.g., as gathered from the probe 246) may be provided to the inspection reporting circuit 330, either through inspection conditions circuit 310, inspection execution circuit 320, or directly. The corrosion mapping system may detect, quantify, and map out I.D. (inner diameter) and O.D. (outer diameter) crevice corrosion from the sealing surface of a flange member of flange joint 100 (such as a weld neck flange) at an early stage state of corrosion (e.g., reference FIGS. 9, 10, and 15A-15C).

The corrosion mapping system may use a corrosion mapping algorithm 332 involving triangulation, which may process exported UT data from the probe 246 (e.g., the UT/PAUT sensor) in a standardized format, for example (*.csv) format. For example, in embodiments, the inspection conditions circuit 310 and/or the inspection execution circuit 320 may process the UT data from the probe 246, and store it and/or provide it to the inspection reporting circuit 330 in a standardized format, or the inspection reporting circuit 330 may receive the UT data directly and store it in a standardized format. Furthermore, the inspection reporting circuit 330 may implement the algorithm as described herein.

The corrosion mapping approach according to embodiments may process UT data using Excel or other software by using trigonometrical equations to determine potential embedded corrosion readings. After the data is processed, the inspection reporting circuit 330 may provide a degradation description in the form of a corrosion mapping or "c-map," which may be displayed on a display device, and which may show the corrosion in palette colors along the sealing surface. As may be described in further detail below with reference to FIGS. 15A-15C, the c-map may be a top or plan view of the corrosion, representing different thickness values associated with the flange sealing surface with different pallet colors, which may include different colors of the color spectrum and/or grayscale values. For example, a yellow to green color gradient on a c-map may represent a decreasing thickness of a flange sealing surface. As the c-map may illustrate an entire 360 degree interrogation of the flange, it may include both an azimuthal and a radial component of the thickness of the sealing surface (which may be parsed into "segments" as described below).

A depicted c-map, as may be displayed on a display device, may be generated using any graphics-enabled software, which in some embodiments may be included in inspection reporting circuit 330, although embodiments are not limited thereto. The corrosion of the sealing surface may be measured or sized by calculating the wall loss or depth of the corrosion from the scaling surface.

By using the embodiments as described herein, UT data (e.g., from the probe 246) may be used to detect corrosion from two parallel opposite surfaces, and such ultrasound unidimensional (A-scan) and encoded data is processed in different views (B, C & D). A UT c-map or c-scan may be the 'C' view and may be an ultrasonic data presentation that provides a plan view of the test object, and discontinuities therein. As described below, the corrosion mapping or c-map according to embodiments herein may process the UT data (a-scans) from surfaces that are not parallel (such as corroded sealing surfaces of a flange) and convert the data to a c-map representation. Thus, the corrosion may be sized and distinguished using pallet colors. Without the corrosion mapping algorithm and data processing as described herein, corrosion may not be evident from raw data.

Figure 8A:
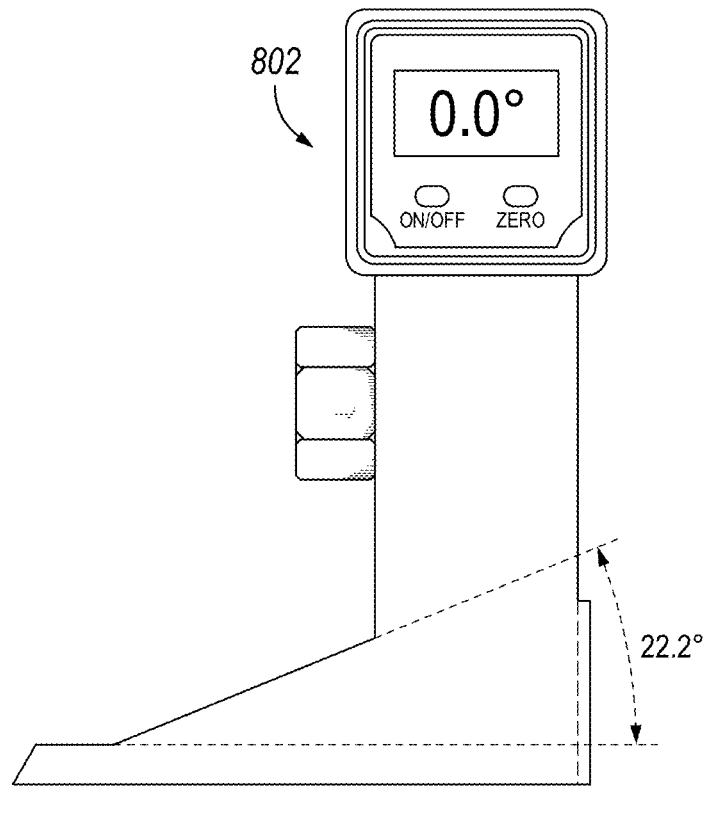
FIGS. 8A and 8B depict the use of a digital electronic level and angle gauge to measure the taper angle according to an example embodiment.
Figure 8B:
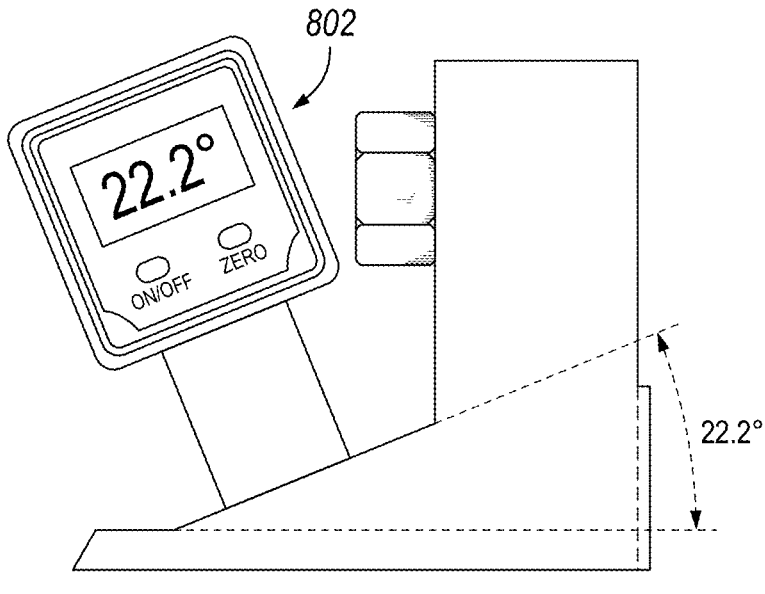

In embodiments, the corrosion mapping algorithm 332 may use the actual taper angle of the flange. The taper angle is illustrated by example in FIGS. 8A-8B, which show the use of a digital electronic level and angle gauge 802 with 0.1 degrees of resolution to measure the taper angle (e.g., relative to a "zeroed" angle of a side of the flange joint). However, in some embodiments, the taper angle may be measured by a second encoder of the clamp scanner 200. In some embodiments, the taper angle may be known or provided by a user (e.g., by measuring with a digital electronic level and angle gauge) instead of and/or in addition to being measured by a second encoder.

After or concurrently with the clamp scanner 200 gathering the UT data as described herein (e.g., through circuitry 300 and the encoders), the inspection reporting circuit 330 may use the corrosion mapping algorithm 332 to determine a c-map for the sealing surface.

Figure 9:
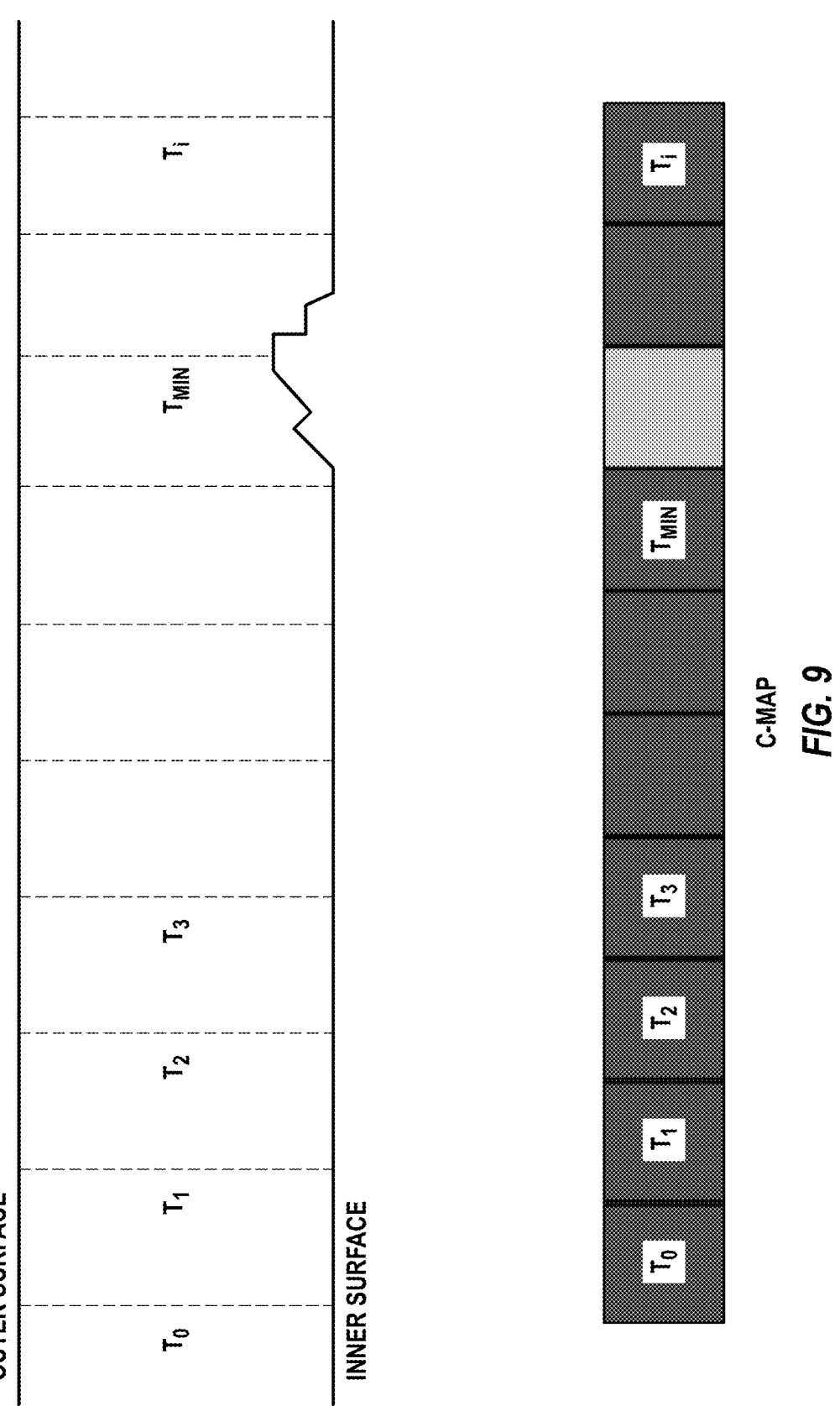
FIG. 9 depicts an example of corrosion mapping on two parallel surfaces according to an example embodiment.

With reference to FIG. 9, corrosion mapping may be performed on two parallel surfaces (e.g., the "OUTER SURFACE" and the "INNER SURFACE" of a wall of FIG. 9). When two surfaces are parallel, inspecting for corrosion with a thickness or 'T' value, colors can be assigned to different 'T' values such that thickness change can be visually observed by a user by the change in colors. For example, FIG. 9 illustrates a lesser thickness Tmin caused by corrosion, which is illustrated by a lighter grayscale color on the one-dimensional c-map.

In embodiments, the resolution (pitch) between 'T' value measurements may be about 0.5 mm for a probe 246 that is a PAUT, and may correspond to the phased array geometry such as the pitch of the PAUT elements. The pitch may vary depending on the probe being used. In some embodiments, the pitch 'P' may instead or also be determined from positional changes of the probe 246 during rastering. In certain embodiments, the pitch may be a hardware arrangement based pitch, for example depending upon the spacing and inspection resolution of elements of the PAUT. In certain embodiments, the pitch may, additionally or alternatively, be an effective pitch, for example based on a distance between sensing positions of one or more elements as the probe 246 is rastered or moved over the flange outer surface.

Figure 10:
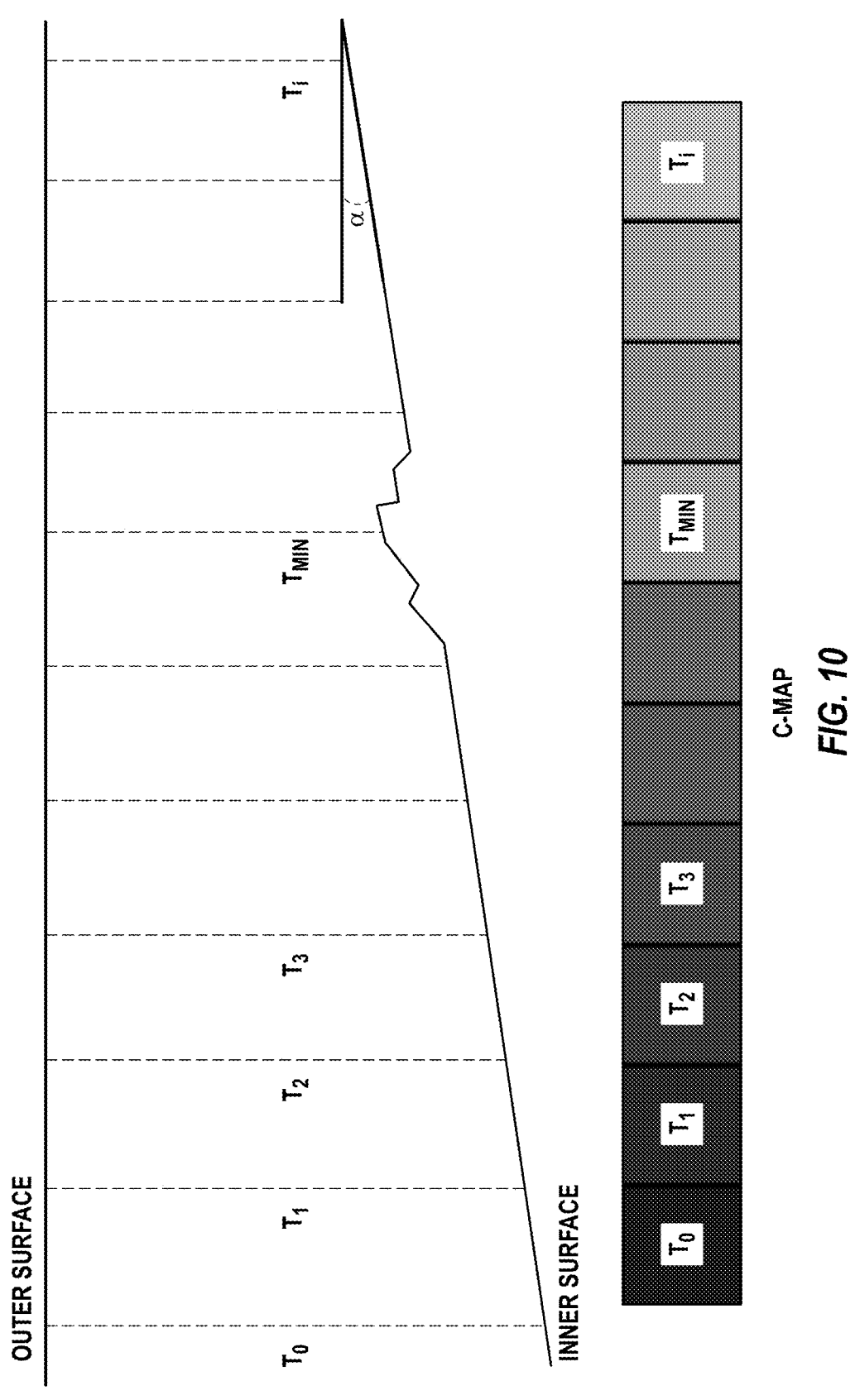
FIG. 10 depicts an example of corrosion mapping on two non-parallel surfaces according to an example embodiment.

With reference to FIG. 10, and in embodiments, the surfaces of a wall (e.g., the "INNER SURFACE" and the "OUTER SURFACE") may not be parallel-such as for a flange member of flange joint 100 with a tapered neck. Determining corrosion for surfaces that are not parallel may require additional calculations because the absolute reading of thickness may not be relied upon. For example, with reference to FIG. 10, the corrosion corresponding to thickness Tmin is shown in a lighter grayscale color, but other non-corroded portions of the inner surface (e.g., those towards the right) are also shown in lighter grayscale colors despite having no corrosion, due to being tapered and having a smaller absolute thickness. However, as described herein, the angle of the taper surface of the flange (which may vary by manufacturer, design, etc.) may be known to circuitry 300.

Thus, according to embodiments, the corrosion mapping algorithm 332 (as may be included in the inspection reporting circuit 330 and/or stored in a non-transitory computer readable storage medium as part of or separate from circuitry 300) may find the "parallelism" of the surfaces by using the angle 'α' of the tapered surface, the separation (i.e., pitch or resolution) 'P' of each 'T' value, and an optional constant value (A). As described above, the taper angle 'α' may be interpreted by an inspection conditions circuit 310 of the circuitry 300. There may be three different cases for which to determine the parallelism for the c-map.

Figure 11:
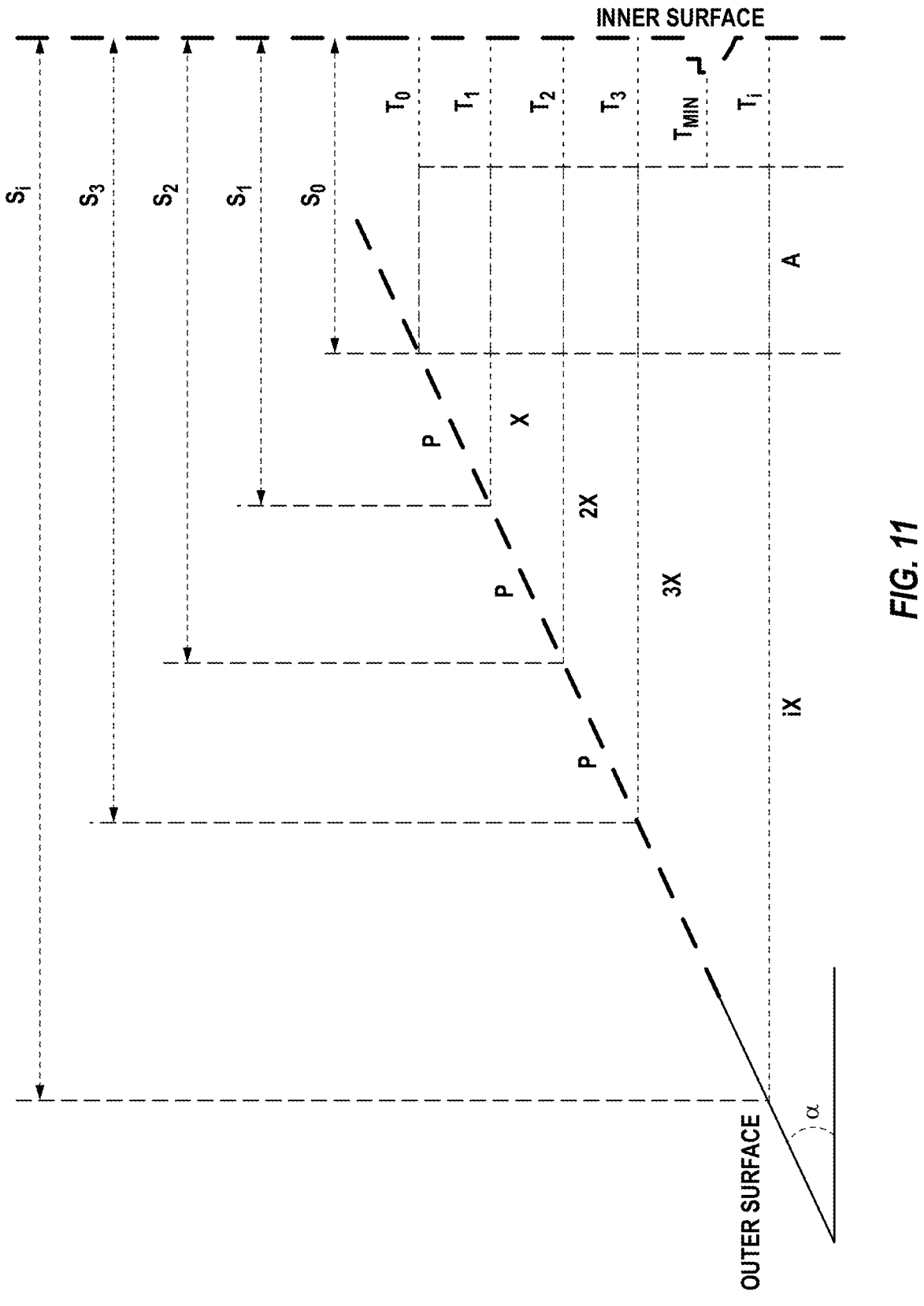
FIGS. 11-13 depict examples of corrosion mapping based on different measurement geometries according to an example embodiments.

With reference to FIG. 11 and as a first case, in embodiments, the outer surface (e.g., the tapered neck of a flange joint 100) may be at a known taper angle 'α', the elements of probe 246 may be at a pitch 'P', which may be the center-to-center spacing of adjacent elements (and/or an effective pitch based on element locations at a time of sensing for a given element), and the sound path distances $(S_0, S_1, S_2, S_3, \ldots, S_i)$, which are measured by the probe 246, may be perpendicular to the inner surface (e.g., a sealing surface) of the flange member of flange joint 100. Meanwhile, a selected value 'A' (which could be zero or even negative) may be provided by circuitry 300 or by a user as a normalizing distance value, which the circuitry 300 may apply as discussed herein. The value of 'A' may be selected to enhance differences in the T-values, for example to increase color variation or other differences between bucketed or grouped T-values, for display on the c-map and/or to enhance other presentation elements to a user. In certain embodiments, the T-values represent thickness differences, for example caused by corrosion, erosion, or the like. In embodiments, the normalizing distance value 'A' may be anything from zero (not used) to P'−T', where P' is the closest pitch (e.g., accounting for PAUT geometry and/or rastering position), and where T' is the greatest expected thickness loss of the flange scaling surface and/or a greatest thickness loss of interest (e.g., a thickness loss representing a failed condition). In certain embodiments, the value 'A' may be a negative value, for example to normalize inspection results between different platforms, to adjust the scale of bucketed T-values, or the like. In certain embodiments, the 'A' value may be utilized or adjusted after inspection operations are complete, for example in a post-processing operation on the inspection data, to adjust the look of displayed inspection information, to distribute T-value data between a number of buckets, to highlight distinctions between inspection values, or the like. For example, if a thickness loss of over 0.5 inches is catastrophic, then there may be no need to determine, e.g., the difference between 0.75 inches and 1 inch of loss. In another example, even where a thickness loss of over 0.5 inches is catastrophic, there may be a desire to distinguish between higher values (e.g., 0.75 inches and 1 inch), for example to quantify corrosion loss, to calibrate a corrosion model, and/or to determine a root cause of a failure. In certain embodiments, multiple 'A' values may be utilized for different displays and/or quantizations of the same inspection data, for example where multiple users of the inspection data may be utilizing the data for different purposes.

Through the below trigonometric equations, the algorithm may solve for thicknesses $T_0$ to $T_i$, including those indicative of corrosion (such as $T_{min}$):

$$Cos(\alpha) = X/P$$

$$X = P * Cos(\alpha)$$

$$T0 = S0 - A$$

$$T1=S1-(A+X)=S1-(A+P^*\text{Cos}(\alpha))$$

$$T2=S2-(A+2^*X)=S2-(A+2^*P^*\text{Cos}(\alpha))$$

$$T3=S3-(A+3^*X)=S3-(A+3^*P^*\text{Cos}(\alpha))$$

$$\cdots$$

$$Ti=Si-(A+i^*X)=Si-(A+i^*P^*\text{Cos}(\alpha)).$$

Figure 12:
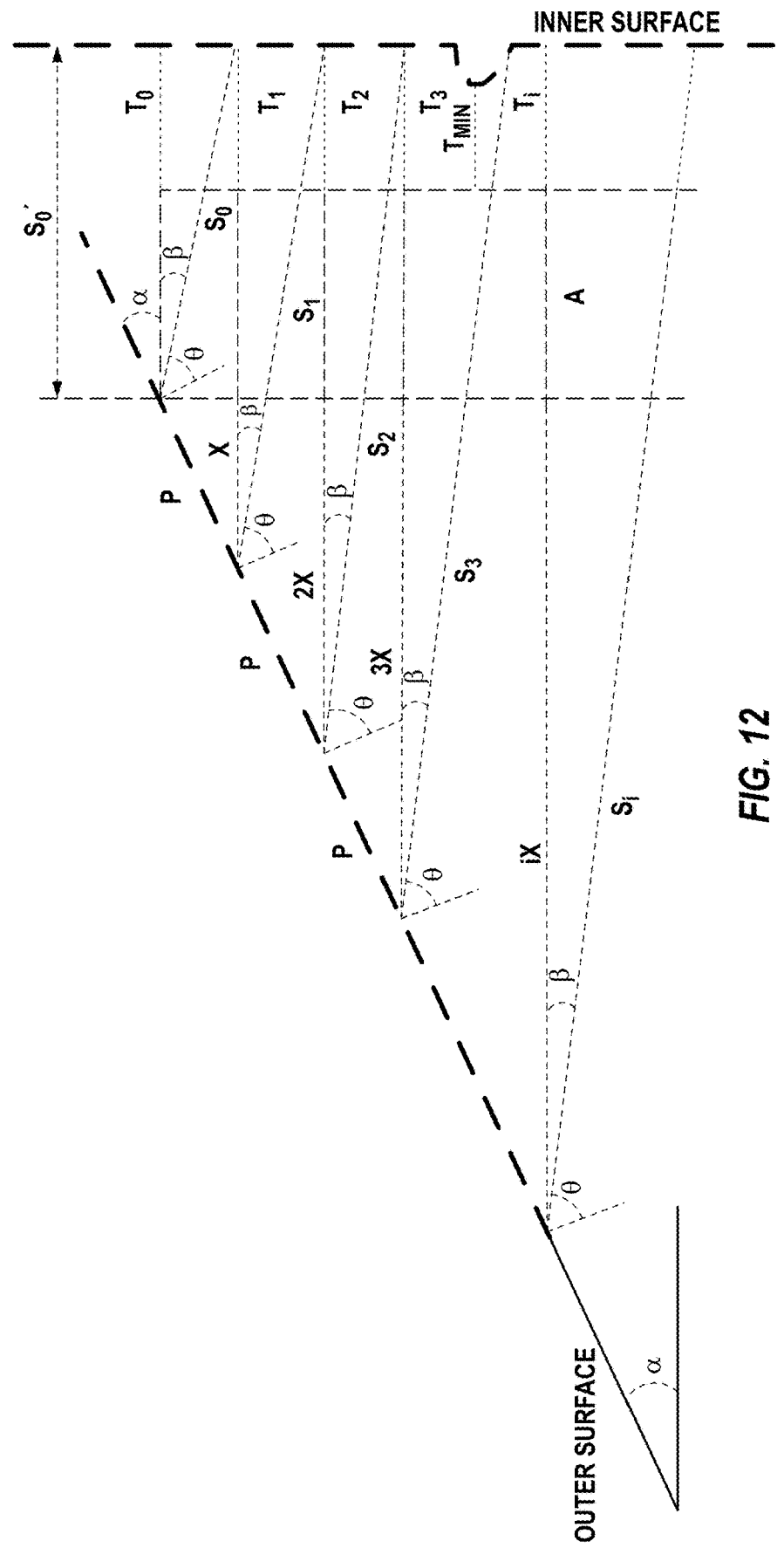

With reference to FIG. 12 and as a second case, in embodiments, the outer surface (e.g., the tapered neck of a flange joint 100) may be at a known taper angle 'α', the elements of probe 246 may be at a pitch 'P', which may be the center-to-center spacing of adjacent elements, and the probes may be inner-facing such that the sound paths (e.g., paths of sound energy) (S0, S1, S2, S3, . . . , Si), which are measured by the probe 246, may not be perpendicular to the inner surface (e.g., a sealing surface) of the flange joint 100. Meanwhile, like in the first case, an arbitrary number 'A' may be provided by circuitry 300 or by a user as normalizing distance value, as described above, which the circuitry 300 may apply as discussed herein. As illustrated in FIG. 12, the angle '$\ominus$' may be the refracted angle, which may depend on the approach of the probe 246, the type of flange joint 100, etc., and which is a number determined and provided by the clamp scanner 200, and 'β' may be a probe angle offset value angle needed to calculate horizontal distance $S_0$' that is perpendicular to the inner surface. The probe angle offset value 'β' may be determined by the clamp scanner 200 (e.g., by circuitry 300 and in an example, by inspection conditions circuit 310). The angles θ and β may be determined as a lookup according to the flange type and size, and the configuration of the clamp scanner assembly. In certain embodiments, the clamp scanner assembly may additionally or alternatively have sensors utilized to help determine the angles θ and/or β, for example with one or more encoders to determine the angles and/or positions of moveable elements (e.g., arms, rastering device(s), probe head angle, etc.) of the clamp scanner assembly, which may also include the changes in these as the probe is moved or rastered over the flange surface (e.g., to determine the angles θ and/or β in response to an off-nominal flange outer surface shape). In embodiments, it is known that α+β+$\ominus$=90°.

Thus, through the below trigonometric equations, the thicknesses $T_0$ to $T_i$ can be solved, including those indicative of corrosion (such as $T_{min}$):

$$\beta=90°-\alpha-\ominus$$

$$\text{Cos}(\beta)=S0'/S0$$

$$S0'=\text{Cos}(\beta)^*S0$$

$$S0'=\text{Cos}(90°-\alpha-\ominus)^*S0$$

$$\text{Cos}(\alpha)=X/P$$

$$X=P^*\text{Cos}(\alpha)$$

$$T0=S0'-A=\text{Cos}(90°-\alpha-\ominus)^*S0-A$$

$$T1=\text{Cos}(90°-\alpha-\ominus)^*S1-(A+X)=\text{Cos}(90°-\alpha-\ominus)^*S1-(A+P^*\text{Cos}(\alpha))$$

$$T2=\text{Cos}(90°-\alpha-\ominus)^*S2-(A+2^*X)=\text{Cos}(90°-\alpha-\ominus)^*S2-(A+2^*P^*\text{Cos}(\alpha))$$

$$T3=\text{Cos}(90°-\alpha-\ominus)^*S3-(A+3^*X)=\text{Cos}(90°-\alpha-\ominus)^*S3-(A+3^*P^*\text{Cos}(\alpha))$$

$$\cdots$$

$$Ti=\text{Cos}(90°-\alpha-\ominus)^*Si-(A+i^*X)=\text{Cos}(90°-\alpha-\ominus)^*Si-(A+i^*P^*\text{Cos}(\alpha)).$$

Figure 13:
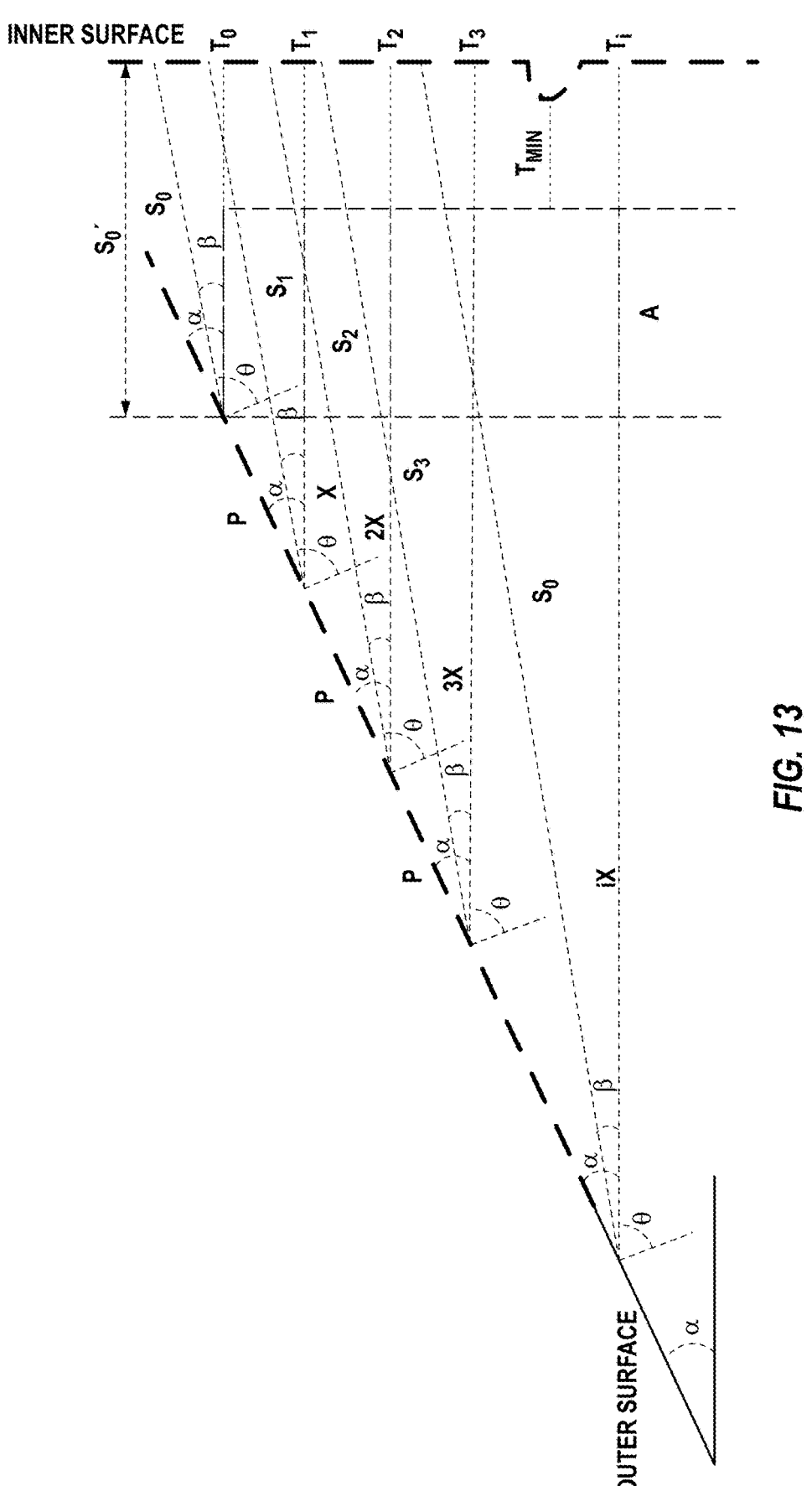

With reference to FIG. 13 and as a third case, in embodiments, the outer surface (e.g., the tapered neck of a flange joint 100) may be at a known taper angle 'α', the elements of probe 246 may be at a pitch 'P', which may be the center-to-center spacing of adjacent elements and may be outer-facing, such that the sound paths (S0, S1, S2, S3, . . . , Si), which are measured by the probe 246, may not be perpendicular to the inner surface (e.g., a sealing surface) of the flange joint 100. Meanwhile, like in the first case, an arbitrary number 'A' may be provided by a user as a normalizing distance value, as described above, which the circuitry 300 may apply as discussed herein. As illustrated in FIG. 13, the angle 'O' is the refracted angle, which may depend on the approach of the probe 246, the type of flange joint 100, etc., and which is a number determined and provided by the clamp scanner 200, and 'β' may be the probe angle offset value needed to calculate horizontal distance $S_0$' that is perpendicular to the inner surface. In this example, the sound paths are angled "above" rather than "below" the horizontals like in FIG. 12. In embodiments, it is known that β=$\ominus$-α. Through the below trigonometric equations, the thicknesses $T_0$ to $T_i$ can be solved, including those indicative of corrosion (such as $T_{min}$):

$$\beta=\ominus-\alpha$$

$$\text{Cos}(\beta)=S0'/S0$$

$$S0'=\text{Cos}(\beta)^*S0$$

$$S0'=\text{Cos}(\ominus-\alpha)^*S0$$

$$\text{Cos}(\alpha)=X/P$$

$$X=P^*\text{Cos}(\alpha)$$

$$T0=S0'-A=\text{Cos}(\ominus-\alpha)^*S0-A$$

$$T1=\text{Cos}(\ominus-\alpha)^*S1-(A+X)=\text{Cos}(\ominus-\alpha)^*S1-(A+P^*\text{Cos}(\alpha))$$

$$T2=\text{Cos}(\ominus-\alpha)^*S2-(A+2^*X)=\text{Cos}(\ominus-\alpha)^*S2-(A+2^*P^*\text{Cos}(\alpha))$$

$$T3=\text{Cos}(\ominus-\alpha)^*S3-(A+3^*X)=\text{Cos}(\ominus-\alpha)^*S3-(A+3^*P^*\text{Cos}(\alpha))$$

$$\cdots$$

$$Ti=\text{Cos}(\ominus-\alpha)^*Si-(A+i^*X)=\text{Cos}(\ominus-\alpha)^*Si-(A+i^*P^*\text{Cos}(\alpha)).$$

In some embodiments, the normalizing distance value 'A' may be provided post-processing, and/or the degradation description (such as the c-map) may be provided in response to the normalizing distance value 'A.' Notably, the normalizing distance value 'A' may not need to be provided at the time of inspection and can be varied by a user post-processing to increase or decree the color difference between thickness variations in a depicted c-map.

The algorithm described above and as may be embodied in inspection reporting circuit 330 may be used to provide the degradation description. In an example, the algorithm described above may be for a particular azimuthal position as a cross-section or "slice" of radial c-map data for that position, as illustrated by example in FIGS. 15A and 15B. Thus, the degradation description may include an azimuthal plot. This algorithm may further determine this c-map slice for, e.g., all or a portion of 360 degrees of rastered data around the flange joint 100, as provided by circuitry 300, to thereby produce a degradation description comprising a c-map as illustrated by example in FIG. 15C. The degradation description may also include an azimuthal plot including, e.g., a greatest loss at each azimuthal position, an average thickness at each azimuthal position, etc.

In embodiments, the degradation description may comprise a bucketed description. For example, the degradation may including a color coding or other categorical description of each "segment" of the c-map. The size of each bucket may be relevant, and may be determined based on the resolution of probe 246 (e.g., the resolution of the PAUT). For example, each segment may include an angular (e.g., 1°, 3°, 5°, 15°, etc.) and/or distance (e.g., 0.5 mm, 1.0 mm, etc.) component. In an example segment, the distance may be at flange inner diameter (e.g., roughly pipe diameter), outer diameter, or a selected position of interest (e.g., where corrosion is expected to occur, where highest corrosion is observed, a distance where the seal is expected to hold even if there is corrosion at lower radial distances, a distance where the seal is expected to fail if corrosion is present, etc.)

Figure 14:
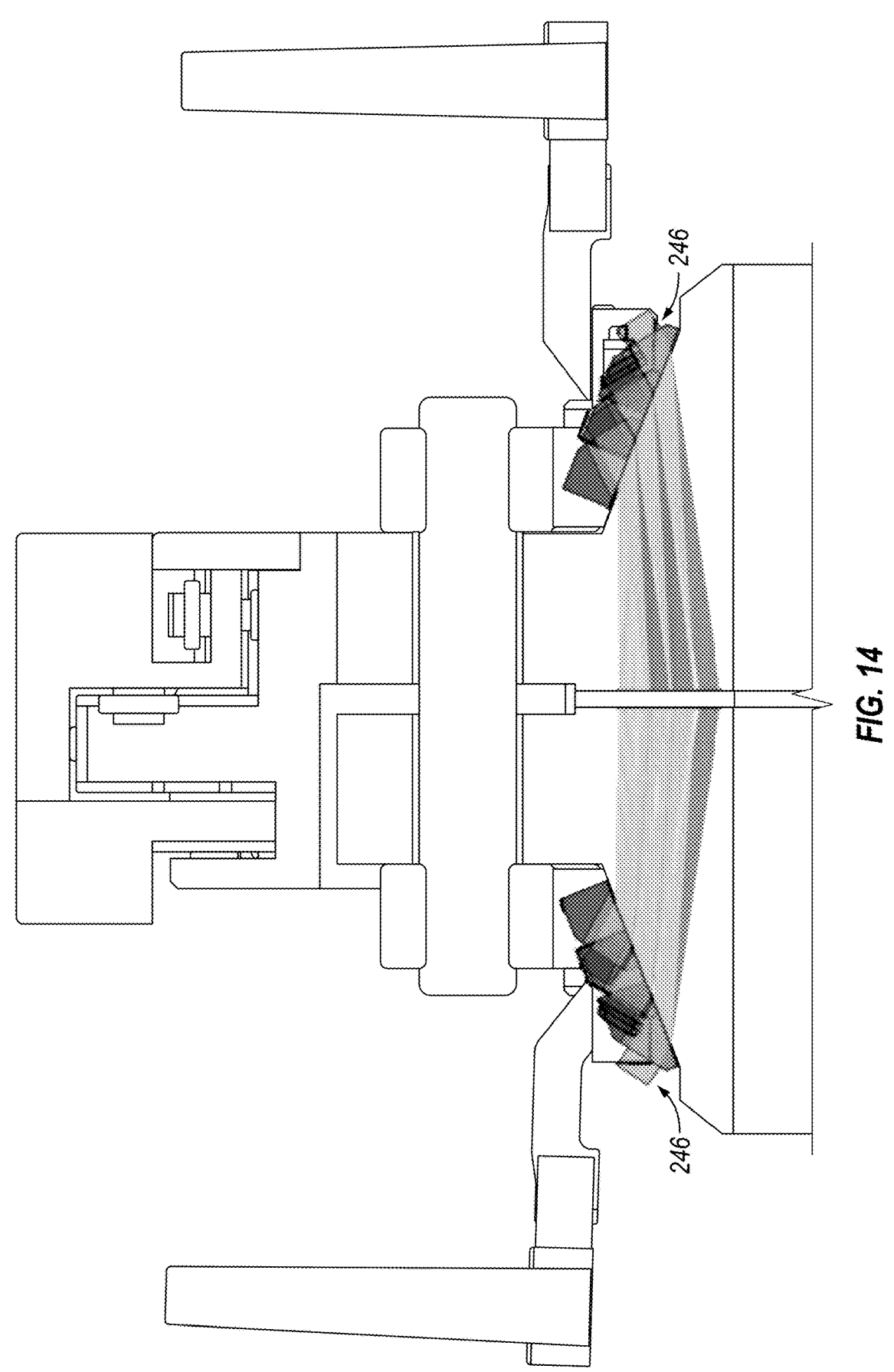
FIG. 14 depicts collecting data with a probe using rastering according to an example embodiment.
Figure 15A:
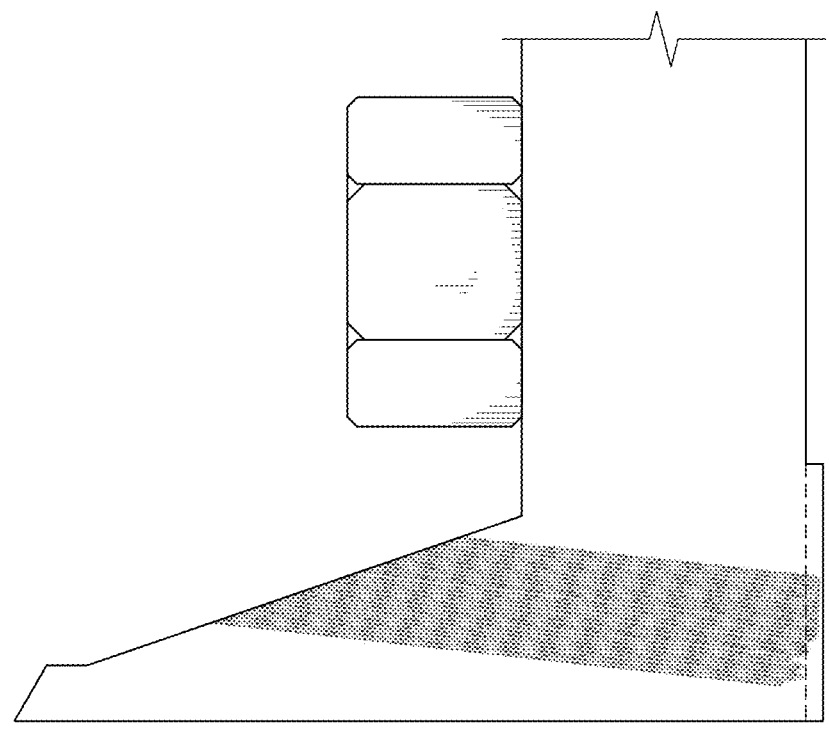
FIGS. 15A-15C depict generation of a corrosion map (c-map) made by collecting data with a rastered probe according to an example embodiment.
Figure 15B:
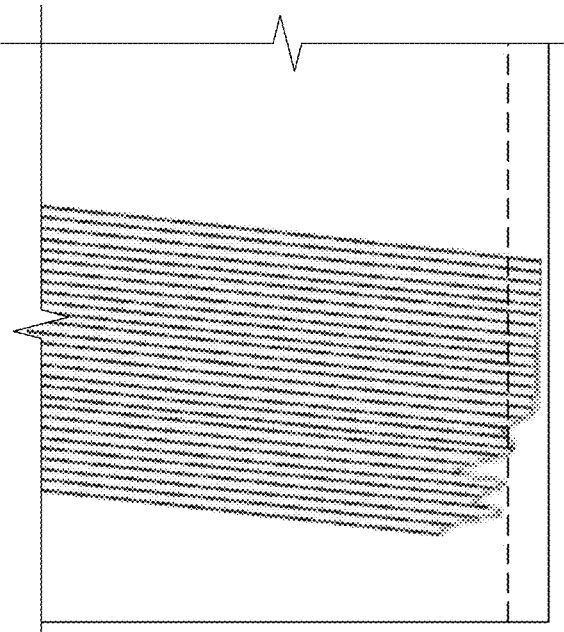
Figure 15C:
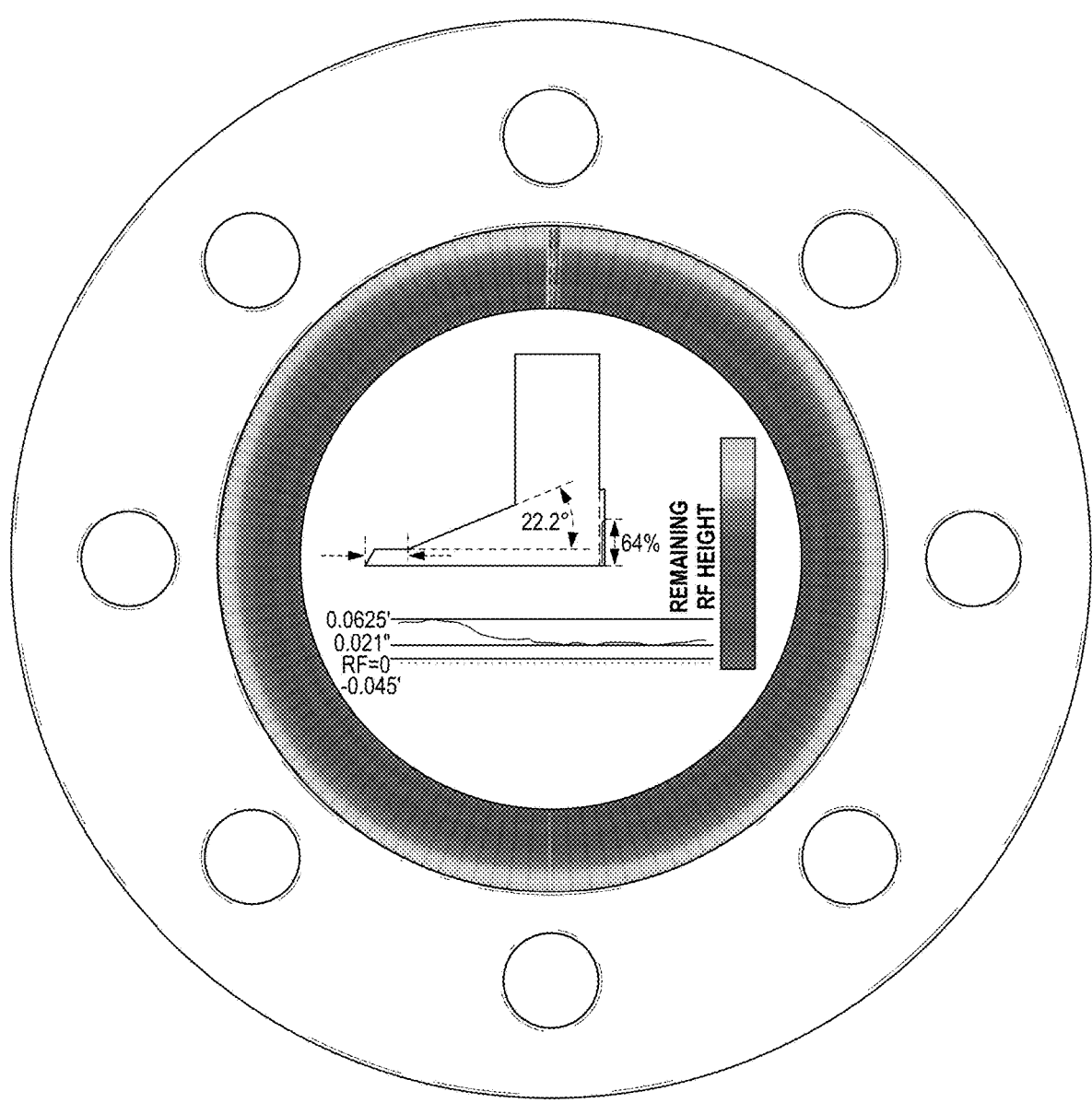

FIG. 14 shows an example of collecting data with probe 246 using rastering according to embodiments. In FIG. 14, the probe 246 is illustrated as including a PAUT, and the probe 246's interface with the flange joint 100 may be adjusted after an interrogation to raster the data at a different angle or position along the tapered neck. This data may be used in the algorithm described above with reference to FIGS. 11-13 to produce a c-map as shown by example in FIG. 15C, which illustrates the variations in the thickness of the flange sealing surface that may thereby indicate corrosion. For example, the c-map of FIG. 15C uses differences in grayscale color to indicate the remaining thicknesses, where a darker shade indicates less remaining thickness.

In an example, when 50% of the sealing surface has about 1 millimeter (~39 mils or thousandths of an inch) or greater of corrosion, the sealing surface may need to be machined to prevent a leak in a short period of time thereafter. Embodiments herein may alert the user when this occurs (e.g., through the circuitry 300 and a display device).

Figure 17:
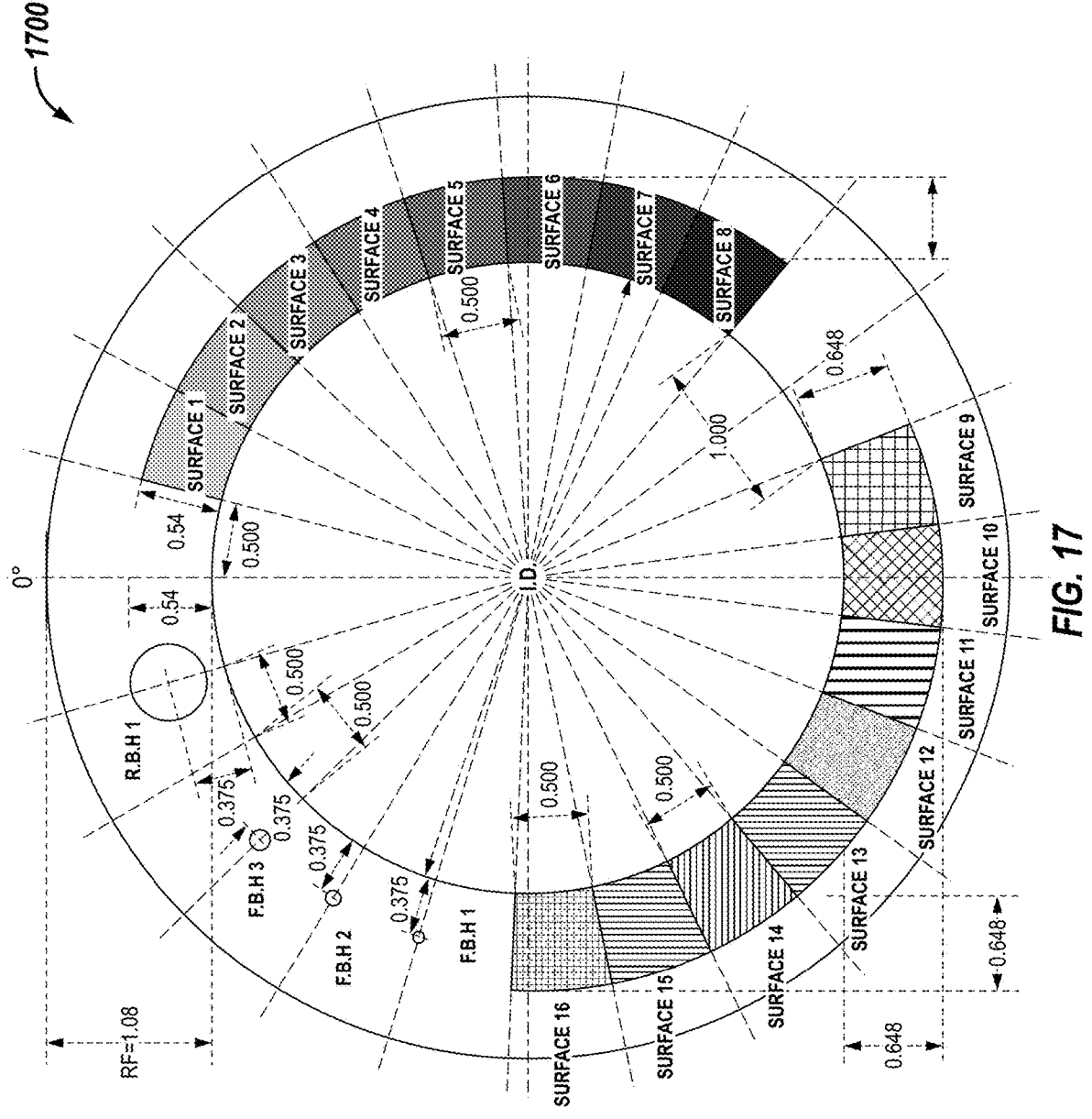
FIG. 17 depicts a calibration block according to an example embodiment.
Figure 18A:
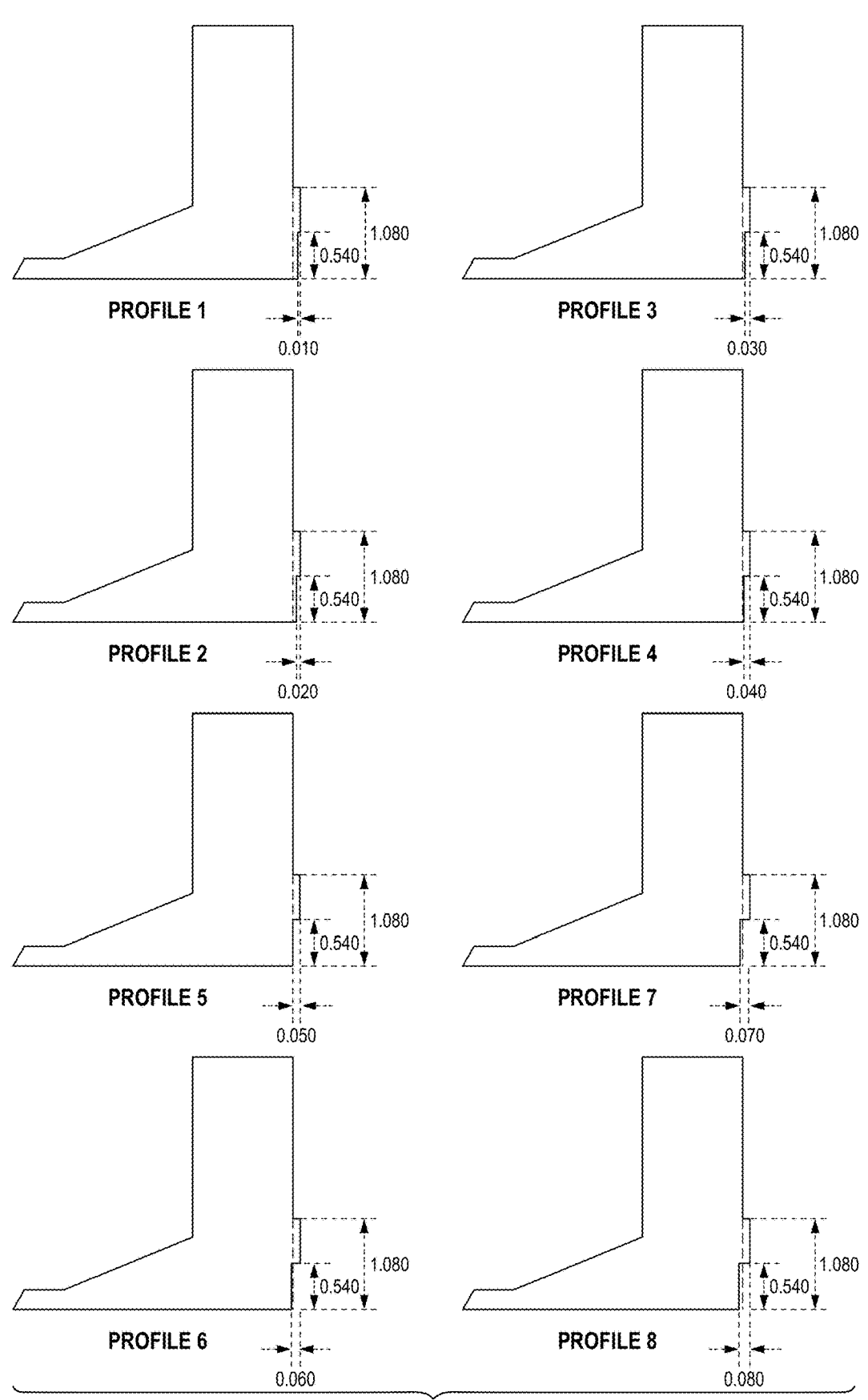
FIGS. 18A-18C depict cross-sections of a calibration block according to an example embodiment.
Figure 18B:
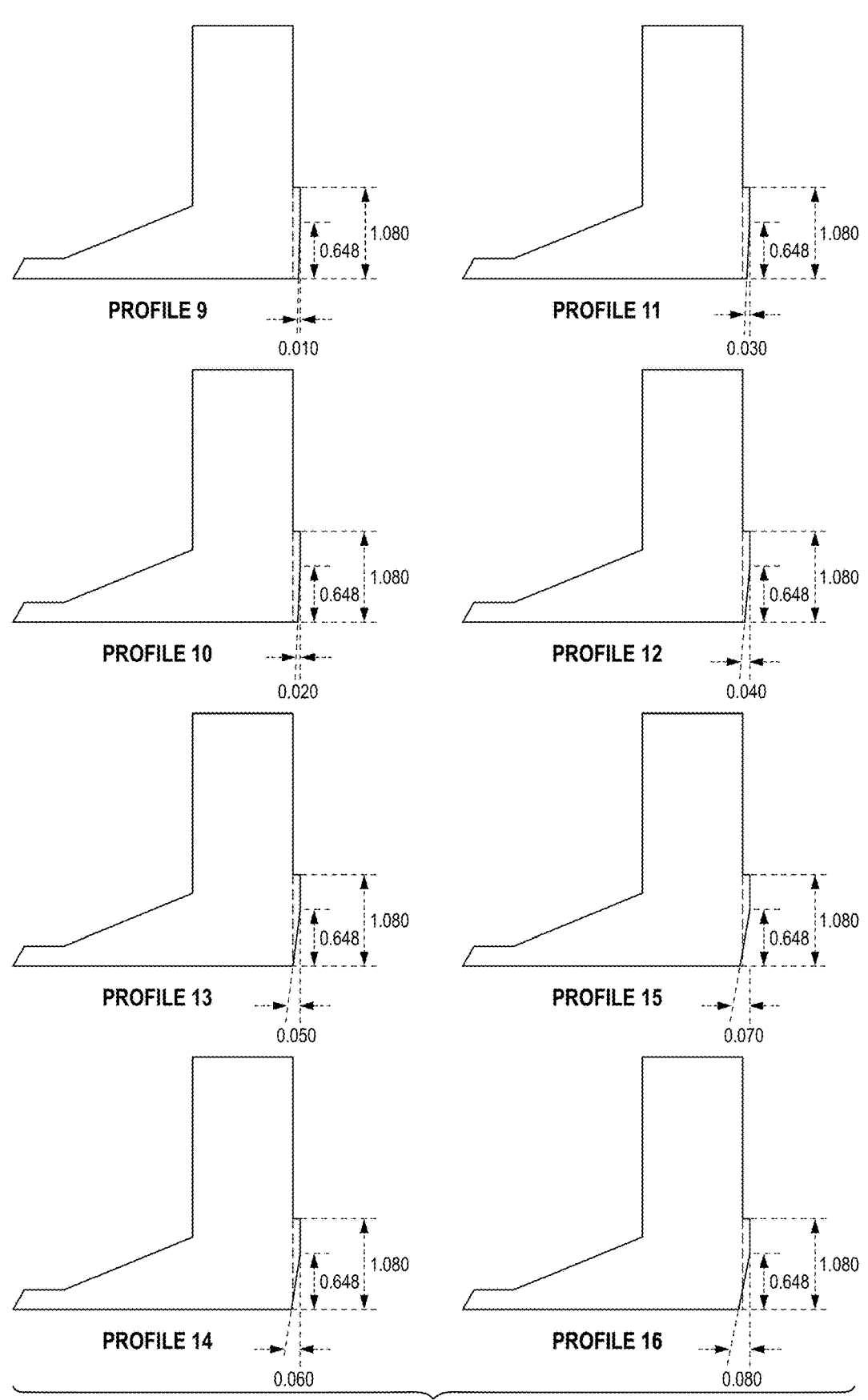
Figure 18C:
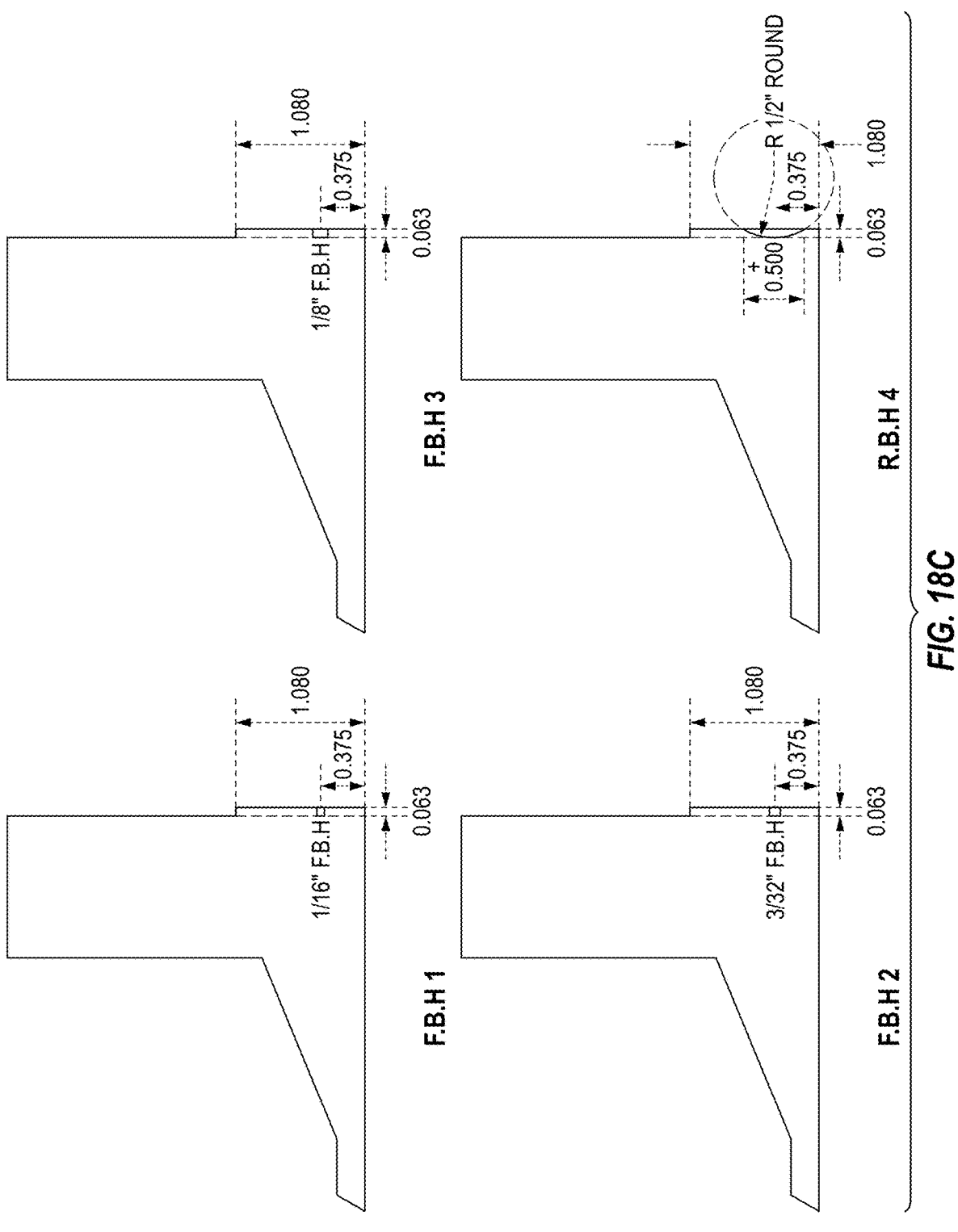

In embodiments, corrosion may include either or both of tapered damage and stepwise damage. As shown in FIGS. 17, 18A-18C, and 19, embodiments may include a calibration block 1700 (e.g., a RFCM sensitivity step wedge flange calibration block) for setting up the sensitivity of the probe 246 on the clamp scanner 200. FIG. 17 shows an example embodiment of a calibration block 1700 for a four inch flange, with different taper damages at for the scaling surface, including Surfaces 1-16, as well as holes (e.g., a round bottom hole R.B.H 1 and flat bottom holes F.B.H 1-F.B.H 3) simulating isolated defects caused by localized corrosion such as from a stone. These taper damages may be created by a precise RFF machined surface, and may simulate wall loss at different stages, shapes, and locations. Surfaces 1-8 have stepwise damage in increments of 10 mils, and respectively correspond to Profiles 1-8 of FIG. 18A, which illustrate cross-sections of the respective stepwise damages in the 10 mil increments. Surfaces 9-16 have tapered damage, and may respectively correspond to Profiles 9-16 of FIG. 18B, which illustrate cross-sections of the respective tapered damages in the 10 mil increments. For example, Profile 12 shows a tapered damage of 40 mils, which (as discussed elsewhere herein) would indicate that the flange needs to be machined. Meanwhile, FIG. 18C illustrates cross-sections of the holes F.B.H 1-F.B.H 3 and R.B.H. 1 in the flange sealing surface as identified in FIG. 17.

Figure 19:
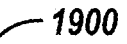
FIG. 19 depicts a calibration block according to an example embodiment.

To accurately detect the damage for the flange being scanned, embodiments may include a calibration block specific to that flange size, and the clamp scanner 200 may be calibrated with the calibration block prior to use on the flange to ensure that the clamp scanner 200 is calibrated and plotting correctly before inspection. For example, calibration blocks may exist for two inch to sixteen inch flanges (e.g., a raised-face flange, ring joint flanges, etc.). FIG. 19 is a photograph of an example calibration block 1900 as depicted in FIGS. 17 and 18A-18C, including the machine surface to simulate stepwise damage, tapered damage, and holes.

FIG. 20 is a flowchart of an example method 2000 for inspecting a flange member according to an example embodiment.

At step 2010, the example method 2000 may include mounting an inner diameter of an inner arc portion of an inspection assembly support ring to the flange member. The inspection assembly support ring may include an outer inspection assembly mount portion rotationally coupled to the inner arc portion with a plurality of bearings interposed therebetween.

At step 2020, the example method 2000 may include engaging an inspection assembly having an ultrasonic (UT) sensor mounted on a pivot arm with a tapered surface of the flange member. The inspection assembly may be mounted on the outer inspection assembly mount portion.

At step 2030, the example method 2000 may include interrogating the flange member with the UT sensor while the UT sensor rotates around the flange member to acquire UT interrogation data therefrom.

In some embodiments, the example method 2000 may further include fixedly coupling the inspection assembly support ring to the flange member.

In some embodiments, the example method 2000 may further include the UT sensor interrogating the flange member while the UT sensor rotates around the flange member in a first direction.

In some embodiments, the example method 2000 may further include adjusting a position of the UT sensor on the tapered surface of the flange member, and interrogating the flange member with the UT sensor while the UT sensor rotates around the flange member in a second direction that is opposite to the first direction to rasterize the UT interrogation data.

In some embodiments, the example method 2000 may further include adjusting a position of the UT sensor on the tapered surface of the flange member, and continuing to rotate the UT sensor around the flange member in the first direction to rasterize the UT interrogation data.

In some embodiments, the example method 2000 may further include determining a degradation description based on the UT interrogation data.

In some embodiments, the example method 2000 may further include determining, as a flange position value, an azimuthal position of the inspection assembly; determining, as a UT engagement angle, at least one of a pivot angle of the pivot arm or an engagement angle of the UT sensor with the tapered surface; and determining the degradation description further based on the flange position value and the UT engagement angle.

In some embodiments, the example method 2000 may further include, based on the flange position value and the UT engagement angle, instructing the UT sensor to interrogate the flange member and associating the UT interrogation data with the flange position value and the UT engagement angle.

In some embodiments, the degradation description includes a corrosion mapping representing a thickness of a flange sealing surface of the flange member and having an azimuthal component and a radial component; and the corrosion mapping is configured to be displayed on a display device.

In some embodiments, the example method 2000 may further include instructing the corrosion mapping to be displayed on the display device.

In some embodiments, the UT interrogation data may include a plurality of sound path distances, and the example method 2000 may further include determining a plurality of thicknesses of the flange sealing surface for the corrosion mapping based on a trigonometric equation involving the plurality of sound path distances and a taper angle of the flange member; and generating the corrosion mapping to include a top view of the flange sealing surface that represents the plurality of thicknesses of the flange sealing surface with a plurality of colors.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof, and may be distributed across devices in a number of ways, or all the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed is:

1. A system for inspecting a flange member, comprising:

an inspection assembly support ring having an inner arc portion and an outer inspection assembly mount portion, the inner arc portion having an inner diameter structured to mount on the flange member, and the outer inspection assembly mount portion rotationally coupled to the inner arc portion with a plurality of bearings interposed therebetween; and an inspection assembly mounted on the outer inspection assembly mount portion, wherein the inspection assembly includes an ultrasonic (UT) sensor on a pivot arm, the UT sensor structured to interrogate a tapered surface of the flange member and to acquire UT interrogation data therefrom.

2. The system of claim 1, further comprising:
the inner arc portion further having a clamp member structured to fixedly couple the inspection assembly support ring to the flange member.

3. The system of claim 1, wherein the UT sensor is a phased array of UT sensors.

4. The system of claim 1, wherein the pivot arm maintains a fixed angle between a first arm of the inspection assembly and a final arm holding the UT sensor.

5. The system of claim 1, wherein a diameter of the flange member is greater than or equal to 1 inch and less than or equal to 10 inches.

6. The system of claim 1, wherein the inspection assembly is structured to provide both radial and axial movement of the UT sensor for rastering along the tapered surface.

7. The system of claim 1, wherein the inspection assembly is further structured to provide for azimuthal movement.

8. The system of claim 1, further comprising:
a circuit structured to determine a degradation description based on the UT interrogation data.

9. The system of claim 8, further comprising:
a first encoder structured to determine, as a flange position value, an azimuthal position of the inspection assembly; and
a second encoder structured to determine, as a UT engagement angle, at least one of a pivot angle of the pivot arm or an engagement angle of the UT sensor with the tapered surface.

10. The system of claim 9, wherein the circuit further comprises:
an inspection conditions circuit structured to interpret the flange position value and the UT engagement angle;
an inspection execution circuit structured to instruct the UT sensor to interrogate the tapered surface of the flange member based on the flange position value and the UT engagement angle and associate the UT interrogation data with the flange position value and the UT engagement angle; and
an inspection reporting circuit structured to determine the degradation description based on the UT interrogation data.

11. The system of claim 8, wherein the circuit is structured to apply a normalizing distance value to determine the degradation description.

12. The system of claim 8, wherein the circuit is structured to determine the degradation description further based on at least one of a determined pitch value of the UT sensor or a taper angle of the tapered surface.

13. The system of claim 8, wherein the circuit is further structured to:
determine a probe angle offset value when sound energy from the UT sensor is not perpendicular to a sealing surface of the flange member; and
determine the degradation description in response to the probe angle offset value.

14. The system of claim 8, wherein:
the degradation description includes a corrosion mapping representing a thickness of a flange sealing surface of the flange member and having an azimuthal component and a radial component; and
the corrosion mapping is configured to be displayed on a display device.

15. A method for inspecting a flange member, comprising:
mounting an inner diameter of an inner arc portion of an inspection assembly support ring to the flange member, wherein the inspection assembly support ring includes the inner arc portion and an outer inspection assembly mount portion rotationally coupled to the inner arc portion with a plurality of bearings interposed therebetween, the inner arc portion having an inner diameter structured to mount on the flange member;
engaging an inspection assembly having an ultrasonic (UT) sensor mounted on a pivot arm with a tapered surface of the flange member, wherein the inspection assembly is mounted on the outer inspection assembly mount portion, and the UT sensor is structured to interrogate a tapered surface of the flange member and to acquire UT interrogation data therefrom; and
interrogating the tapered surface of the flange member with the UT sensor while the UT sensor rotates around the flange member to acquire the UT interrogation data therefrom.

16. The method of claim 15, further comprising:
fixedly coupling the inspection assembly support ring to the flange member.

17. The method of claim 15, wherein the UT sensor interrogates the flange member while the UT sensor rotates around the flange member in a first direction.

18. The method of claim 17, further comprising:
adjusting a position of the UT sensor on the tapered surface of the flange member; and
interrogating the flange member with the UT sensor while the UT sensor rotates around the flange member in a second direction that is opposite to the first direction to rasterize the UT interrogation data.

19. The method of claim 17, further comprising:
adjusting a position of the UT sensor on the tapered surface of the flange member; and
continuing to rotate the UT sensor around the flange member in the first direction to rasterize the UT interrogation data.

20. The method of claim 15, further comprising:
determining a degradation description based on the UT interrogation data.

21. The method of claim 20, further comprising:
determining, as a flange position value, an azimuthal position of the inspection assembly;
determining, as a UT engagement angle, at least one of a pivot angle of the pivot arm or an engagement angle of the UT sensor with the tapered surface; and
determining the degradation description further based on the flange position value and the UT engagement angle.

22. The method of claim 21, further comprising:
based on the flange position value and the UT engagement angle, instructing the UT sensor to interrogate the flange member and associating the UT interrogation data with the flange position value and the UT engagement angle.

23. The method of claim 20, wherein:
the degradation description includes a corrosion mapping representing a thickness of a flange sealing surface of the flange member and having an azimuthal component and a radial component; and
the corrosion mapping is configured to be displayed on a display device.

24. The method of claim 23, further comprising:
instructing the corrosion mapping to be displayed on the display device.

25. The method of claim 23, wherein the UT interrogation data includes a plurality of sound path distances, and the determining the degradation description further comprises:

determining a plurality of thicknesses of the flange sealing surface for the corrosion mapping based on a trigonometric equation involving the plurality of sound path distances and a taper angle of the flange member; and generating the corrosion mapping to include a top view of the flange sealing surface that represents the plurality of thicknesses of the flange sealing surface with a plurality of colors.

26. A non-transitory computer readable storage medium storing instructions that when executed by a processor comprise:

instructing an ultrasonic (UT) sensor to interrogate a flange member while the UT sensor rotates around a tapered surface of the flange member, wherein the UT sensor is included on a pivot arm of an inspection assembly, the UT sensor structured to interrogate the tapered surface of the flange member and to acquire UT interrogation data therefrom, and wherein the inspection assembly is mounted on an outer assembly mount portion of an inspection assembly support ring, the inspection assembly support ring having an inner arc portion and the outer inspection assembly mount portion, the inner arc portion having an inner diameter structured to mount on the flange member, and the outer inspection assembly mount portion rotationally coupled to the inner arc portion with a plurality of bearings interposed therebetween;

receiving the UT interrogation data from the UT sensor, wherein the UT interrogation data includes a plurality of sound path distances;

determining a plurality of thicknesses of a sealing surface of the flange member based on the plurality of sound path distances and a taper angle of the tapered surface of the flange member; and generating, as a degradation description, a corrosion mapping representing a thickness of a flange sealing surface of the flange member and having an azimuthal component and a radial component, wherein the corrosion mapping is configured to be displayed on a display device.

27. The non-transitory computer readable storage medium of claim 26, wherein the corrosion mapping includes a top view of the flange sealing surface that represents the plurality of thicknesses of the sealing surface with a plurality of colors.

28. The non-transitory computer readable storage medium of claim 26, wherein the UT sensor is mounted on an inspection assembly including a pivot arm, and the instructions further comprising:

determining, as a flange position value, an azimuthal position of the inspection assembly; and determining, as a UT engagement angle, at least one of a pivot angle of the pivot arm or an engagement angle of the UT sensor with the tapered surface.

29. The non-transitory computer readable storage medium of claim 28, the instructions further comprising:

determining the degradation description further based on the flange position value and the UT engagement angle.

30. The non-transitory computer readable storage medium of claim 26, the instructions further comprising:

determining the plurality of thicknesses of the sealing surface of the flange member based on a trigonometric equation involving the plurality of sound path distances and the taper angle of the tapered surface.

31. The non-transitory computer readable storage medium of claim 26, the instructions further comprising:

instructing the corrosion mapping to be displayed on the display device.

* * * * *